(12) United States Patent
Ohtsuji et al.

(10) Patent No.: US 12,058,527 B2
(45) Date of Patent: Aug. 6, 2024

(54) TRANSMISSION APPARATUS RECOGNITION APPARATUS, LEARNING APPARATUS, TRANSMISSION APPARATUS RECOGNITION METHOD, AND, LEARNING METHOD

(71) Applicant: NEC Corporation, Tokyo (JP)

(72) Inventors: Taichi Ohtsuji, Tokyo (JP); Toshiki Takeuchi, Tokyo (JP); Hiroyuki Akiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 422 days.

(21) Appl. No.: 17/542,665

(22) Filed: Dec. 6, 2021

(65) Prior Publication Data

US 2022/0182840 A1 Jun. 9, 2022

(30) Foreign Application Priority Data

Dec. 9, 2020 (JP) .................... 2020-204129

(51) Int. Cl.
*H04W 12/69* (2021.01)
*G06F 18/10* (2023.01)
*G06F 18/22* (2023.01)
*G06N 20/00* (2019.01)

(52) U.S. Cl.
CPC ............ *H04W 12/69* (2021.01); *G06F 18/10* (2023.01); *G06F 18/22* (2023.01); *G06N 20/00* (2019.01)

(58) Field of Classification Search
CPC ..... H04W 12/06; H04W 12/63; H04W 12/69; H04W 12/79; H04W 16/18
See application file for complete search history.

(56) References Cited

U.S. PATENT DOCUMENTS

| 11,599,813 | B1* | 3/2023 | Yuan ...................... G06N 20/00 |
| 11,868,429 | B1* | 1/2024 | Stone ..................... G06N 20/00 |
| 11,921,162 | B2* | 3/2024 | Hatano ................ G01R 31/396 |
| 2016/0042747 | A1* | 2/2016 | Endo ....................... G10L 25/84 |
| | | | 704/226 |
| 2018/0203571 | A1* | 7/2018 | Dayanandan ............ G06F 8/38 |

(Continued)

OTHER PUBLICATIONS

S. U. Rehman et al., "Analysis of Receiver Front End on the Performance of RF Fingerprinting," 2012 IEEE 23rd International Symposium on Personal, Indoor and Mobile Radio Communications (PIMRC), pp. 2494-2499.

*Primary Examiner* — Jean A Gelin

(57) ABSTRACT

A transmission apparatus recognition apparatus includes a storage unit that stores K sets of template feature groups for estimating K (an integer of 2 or more) kinds of information indicative of a transmission apparatus, a degree-of-similarity calculation unit that generates an i (an integer of 1 to K)-th sample feature from a radio feature, and calculates an i-th degree-of-similarity group, based on the i-th sample feature and an i-th set of the template feature group, a summed degree-of-similarity calculation unit that calculates a summed degree of similarity by summing K degrees of similarity by using an i-th weighting factor with respect to 1 to K of i, and an estimation unit that estimates that K information pieces, which are correlated in advance with calculation sources of K degrees of similarity having the summed degree of similarity that is highest, are information indicative of the transmission apparatus.

8 Claims, 16 Drawing Sheets

(56) References Cited

U.S. PATENT DOCUMENTS

| | | | |
|---|---|---|---|
| 2018/0368764 A1* | 12/2018 | Mori | A61B 5/11 |
| 2018/0373925 A1* | 12/2018 | Wang | G08B 21/043 |
| 2019/0043201 A1* | 2/2019 | Strong | G06V 10/96 |
| 2019/0311114 A1* | 10/2019 | Mei | G06F 21/50 |
| 2020/0005795 A1* | 1/2020 | Chae | H04W 52/0229 |
| 2020/0309518 A1* | 10/2020 | Kanbayashi | H04W 4/40 |
| 2020/0310874 A1* | 10/2020 | Shiraishi | G06F 1/329 |
| 2020/0328947 A1* | 10/2020 | Iwai | H04L 41/142 |
| 2021/0166331 A1* | 6/2021 | Buglak | G06Q 40/03 |
| 2021/0201490 A1* | 7/2021 | Lyu | A61B 5/7285 |
| 2021/0304031 A1* | 9/2021 | Adachi | G06N 20/00 |
| 2021/0383257 A1* | 12/2021 | Nishida | G06N 3/042 |
| 2023/0115855 A1* | 4/2023 | Saad | G06Q 30/0641 |
| | | | 706/11 |
| 2023/0130875 A1* | 4/2023 | Brook | G06Q 10/0639 |
| | | | 701/29.1 |

* cited by examiner

TRANSMISSION APPARATUS RECOGNITION APPARATUS, LEARNING APPARATUS, TRANSMISSION APPARATUS RECOGNITION METHOD, AND, LEARNING METHOD

INCORPORATION BY REFERENCE

This application is based upon and claims the benefit of priority from Japanese patent application No. 2020-204129, filed on Dec. 9, 2020, the disclosure of which is incorporated herein in its entirety by reference.

TECHNICAL FIELD

The present disclosure relates to a transmission apparatus recognition apparatus, a learning apparatus, a transmission apparatus recognition method, a learning method, and a program.

BACKGROUND ART

Techniques for determining a wireless terminal apparatus (hereinafter, simply referred to as a wireless terminal) such as a mobile terminal apparatus have been proposed.

For example, S. U. Rehman, K. Sowerby, and C. Coghill, "Analysis of Receiver Front End on the Performance of RF Fingerprinting", 2012 IEEE 23rd International Symposium on Personal, Indoor, and Mobile Radio Communications (PIMRC), pp. 2494-2499, 2012 describes a radio wave identification system in which a receiver determines (identifies) a wireless terminal, based on the characteristics of a signal received from the wireless terminal. This radio wave identification system converts the waveform of a known signal such as a preamble signal into a power spectral density. After that, the radio wave identification system learns using the power spectral density as a feature, with use of a machine learning algorithm such as the k-nearest neighbor algorithm, and generates an identification model. After that, the radio wave identification system inputs the feature extracted from a received signal into the trained model to identify which terminal transmits among the trained wireless terminals.

SUMMARY

The inventor has devised that, aside from information indicative of "individual" of the above-described wireless terminal, a plurality of kinds of information are extracted from the received signal, for example, information indicative of "model" of the wireless terminal, such as model B of maker A, and information indicative of "attribute" that indicates the kind of the wireless terminal. Note that the kind of the wireless terminal means, for example, the kind of an apparatus such as a smartphone or a laptop PC, and can be the kind corresponding to, for example, a purpose of use, or a mode of use.

The inventor has made an attempt, as a method for the above extraction, to change a label which is given together with a feature where necessary, for example, when a model is trained by using a machine learning or deep learning algorithm. This attempt is to change the label, thereby changing the information (e.g. individual, model and attribute) which the trained model is caused to determine.

When a plurality of kinds of information indicative of the wireless termination (transmission apparatus) are to be extracted from the received signal, it suffices that these kinds of information (e.g. individual, model, and attribute) are correlated on the database. By this correlation, if one kind of information (e.g. individual) is determined, the other kinds of information (e.g. model and attribute) are naturally determined.

However, in some cases, for example, the accuracy differs when learning models are separately generated for individual estimation, model estimation and attribute estimation. In particular, in a case where a signal-to-noise ratio (SNR) is low or in a case of a situation in which the surrounding environment of the receiver is greatly different from the surrounding environment at the time of learning, there is a tendency that the difference in accuracy of the respective estimation results becomes large. Accordingly, there is a possibility that the accuracy can be made higher by combining the estimation of one kind of information (e.g. individual) and the estimation of other kind of information, such as model estimation, rather than estimating only the one kind of information (e.g. individual). On the other hand, however, such a problem arises that inconsistency may possibly occur between information pieces indicated by the estimation results of the respective kinds.

Note that, in the technique described in "Analysis of Receiver Front End on the Performance of RF Fingerprinting", the information that is the target of identification (recognition, estimation) is only the "individual" of a transmission apparatus, and the extraction of a plurality of kinds of information is not taken into account, and thus the above-described problem is not solved.

In consideration of the above problems, an example object of the present disclosure is to provide a transmission apparatus recognition apparatus, a transmission apparatus recognition method, and a program, which are capable of reducing a situation in which estimation results become inconsistent when a plurality of kinds of information indicative of a transmission apparatus that is a recognition target are estimated from a signal wirelessly transmitted from the transmission apparatus. Another example object of the present disclosure is to provide a learning apparatus, a learning method, and a program, which generate a learning model used in the transmission apparatus recognition apparatus.

A transmission apparatus recognition apparatus according to a first example aspect of the present disclosure includes a receiving unit (receiver) configured to receive a signal wirelessly transmitted from a transmission apparatus; and a radio feature generation unit configured to generate a radio feature from a received signal received by the receiving unit. Further, the transmission apparatus recognition apparatus includes a storage unit configured to store K sets of template feature groups for estimating K kinds of information indicative of the transmission apparatus, K being an integer of 2 or more. The K sets include a set of a template feature group indicative of a predetermined kind, and a set of a template feature group indicative of one or more other kinds, information of which can be determined by information of the predetermined kind. In addition, the transmission apparatus recognition apparatus includes a degree-of-similarity calculation unit, a summed degree-of-similarity calculation unit, and an estimation unit. The degree-of-similarity calculation unit is configured to generate an i-th sample feature from the radio feature, i being an integer of 1 to K, and is configured to calculate an i-th degree-of-similarity group that is degrees of similarity between the i-th sample feature and template features included in an i-th set of the template feature group. The summed degree-of-similarity calculation unit is configured to calculate a summed degree of similarity by executing a process including a weighted-summing process. The weighted-summing process selects, one by one, the degrees of similarity included in the i-th degree-of-similarity group, with respect to 1 to K of i, and weighted-sums the degrees of similarity included in the i-th degree-of-similarity group by an i-th weighting factor with respect to K selected degrees of similarity in total. The estimation unit is configured to estimate, with respect to K template features that are calculation sources of K degrees of similarity having the summed degree of similarity that is highest, that K information pieces correlated in advance with the K template features are information indicative of the transmission apparatus that transmitted the received signal.

A learning apparatus according to a second example aspect of the present disclosure includes an input unit configured to input therein a radio feature generated from a received signal, the received signal being a signal wirelessly transmitted from a transmission apparatus and received; and a learning unit. The learning unit is configured to generate a learning model which inputs therein the radio feature that is input by the input unit, and outputs a parameter for generating an i-th sample feature for calculating degrees of similarity to an i-th set of a template feature group, and an i-th weighting factor. It is assumed that K is an integer of 2 or more, and i is an integer of 1 to K. K sets of template feature groups include a template feature group indicative of a predetermined kind, and a template feature group indicative of one or more other kinds, information of which can be determined by information of the predetermined kind. The i-th weighting factor is a factor by which an i-th degree of similarity is weighted when a weighted-summing process is executed for the i-th degree of similarity with respect to 2 to K of i, the i-th degree of similarity being a degree of similarity for the i-th sample feature.

A transmission apparatus recognition method according to a third example aspect of the present disclosure includes a radio feature generation step, a degree-of-similarity calculation step, a summed degree-of-similarity calculation step, and an estimation step, which are executed by a transmission apparatus recognition apparatus. The transmission apparatus recognition apparatus includes a receiving unit configured to receive a signal wirelessly transmitted from a transmission apparatus, and a storage unit configured to store K sets of template feature groups for estimating K kinds of information indicative of the transmission apparatus, K being an integer of 2 or more. The K sets include a set of a template feature group indicative of a predetermined kind, and a set of a template feature group indicative of one or more other kinds, information of which can be determined by information of the predetermined kind. The radio feature generation step generates a radio feature from a received signal received by the receiving unit. The degree-of-similarity calculation step generates an i-th sample feature from the radio feature, i being an integer of 1 to K, and calculates an i-th degree-of-similarity group. The i-th degree-of-similarity group is degrees of similarity between the i-th sample feature and template features included in an i-th set of the template feature group. The summed degree-of-similarity calculation step calculates a summed degree of similarity by executing a process including a weighted-summing process. The weighted-summing process selects, one by one, the degrees of similarity included in the i-th degree-of-similarity group, with respect to 1 to K of i, and weighted-sums the degrees of similarity included in the i-th degree-of-similarity group by an i weighting factor with respect to K selected degrees of similarity in total. The estimation step estimates, with respect to K template features that are calculation sources of K degrees of similarity having the summed degree of similarity that is highest, that K information pieces correlated in advance with the K template features are information indicative of the transmission apparatus that transmitted the received signal.

A learning method according to a fourth example aspect of the present disclosure includes an input step of inputting a radio feature generated from a received signal, the received signal being a signal wirelessly transmitted from a transmission apparatus and received; and a learning step. The learning step generates a learning model which inputs therein the radio feature that is input by the input step, and outputs a parameter for generating an i-th sample feature for calculating degrees of similarity to an i-th set of a template feature group, and an i-th weighting factor. It is assumed that K is an integer of 2 or more, and i is an integer of 1 to K. K sets of template feature groups include a template feature group indicative of a predetermined kind, and a template feature group indicative of one or more other kinds, information of which can be determined by information of the predetermined kind. The i-th weighting factor is a factor by which an i-th degree of similarity is weighted when a weighted-summing process is executed for the i-th degree of similarity with respect to 2 to K of i, the i-th degree of similarity being a degree of similarity for the i-th sample feature.

A program according to a fifth example aspect of the present disclosure is a program for causing a computer to execute a radio feature generation step, a degree-of-similarity calculation step, a summed degree-of-similarity calculation step, and an estimation step. The computer includes a receiving unit configured to receive a signal wirelessly transmitted from a transmission apparatus, and a storage unit configured to store K sets of template feature groups for estimating K kinds of information indicative of the transmission apparatus, K being an integer of 2 or more. The K sets include a set of a template feature group indicative of a predetermined kind, and a set of a template feature group indicative of one or more other kinds, information of which can be determined by information of the predetermined kind. The radio feature generation step generates a radio feature from a received signal received by the receiving unit. The degree-of-similarity calculation step generates an i-th sample feature from the radio feature, and calculates an i-th degree-of-similarity group that is degrees of similarity between the i-th sample feature and template features included in an i-th set of the template feature group. It is assumed that i is an integer of 1 to K. The summed degree-of-similarity calculation step calculates a summed degree of similarity by executing a process including a weighted-summing process. The weighted-summing process selects, one by one, the degrees of similarity included in the i-th degree-of-similarity group, with respect to 1 to K of i, and weighted-sums the degrees of similarity included in the i-th degree-of-similarity group by an i-th weighting factor with respect to K selected degrees of similarity in total. The estimation step estimates, with respect to K template features that are calculation sources of K degrees of similarity having the summed degree of similarity that is highest, that K information pieces correlated in advance with the K template features are information indicative of the transmission apparatus that transmitted the received signal.

A program according to a sixth example aspect of the present disclosure is a program for causing a computer to execute an input step of inputting a radio feature generated from a received signal, the received signal being a signal wirelessly transmitted from a transmission apparatus and received; and a learning step of generating a learning model. It is assumed that K is an integer of 2 or more and i is an integer of 1 to K. K sets of template feature groups include a template feature group indicative of a predetermined kind, and a template feature group indicative of one or more other kinds, information of which can be determined by information of the predetermined kind. The learning model inputs therein the radio feature that is input by the input step. The learning model outputs a parameter for generating an i-th sample feature for calculating degrees of similarity to an i-th set of a template feature group, and an i-th weighting factor. The i-th weighting factor is a factor by which an i-th degree of similarity is weighted when a weighted-summing process is executed for the i-th degree of similarity with respect to 2 to K of i, the i-th degree of similarity being a degree of similarity for the i-th sample feature.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENT

Hereinafter, example embodiments will be described with reference to the accompanying drawings. In the present specification and drawings, elements that can be described in the same manner may be designated by the same reference signs so that duplicate description may be omitted. In addition, the drawings to be described below include a drawing in which a unidirectional arrow is depicted, but this arrow straightforwardly indicates the direction of flow of a signal (data), and does not exclude bidirectionality.

First Example Embodiment

Figure 1:
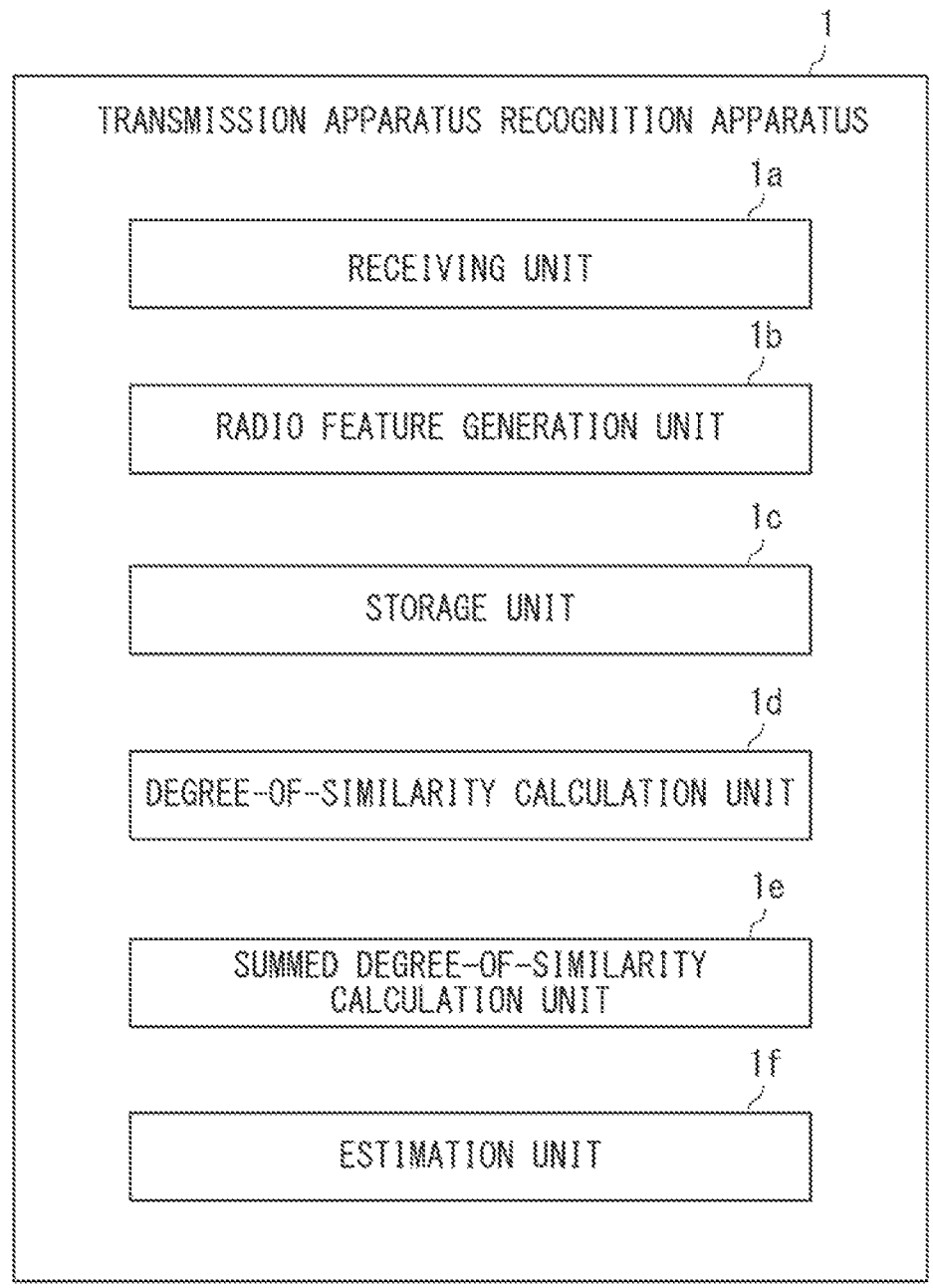
FIG. 1 is block is a block diagram showing a configuration example of a transmission apparatus recognition apparatus according to a first example embodiment.

A first example embodiment will be described with reference to FIG. 1. FIG. 1 is a block diagram showing a configuration example of a transmission apparatus recognition apparatus according to the present example embodiment.

As shown in FIG. 1, the transmission apparatus recognition apparatus 1 according to the present example embodiment can include a receiving unit 1a, a radio feature generation unit 1b, a storage unit 1c, a degree-of-similarity calculation unit 1d, a summed degree-of-similarity calculation unit 1e, and an estimation unit if.

The receiving unit 1a is configured to receive a signal which is wirelessly transmitted from a transmission apparatus (not shown), and is also referred to as a receiver, a wireless receiving unit, or a radio wave sensor. In addition, the transmission apparatus may include not only a wireless terminal apparatus (wireless terminal) which is capable of wireless transmission, but also an apparatus which unintendedly emits a radio wave (a light-emitting diode (LED) device that emits noise, a wireless apparatus with a faulty amplifier, or the like). Hereinafter, a description will be given by referring to the transmission apparatus as "transmission terminal", or simply as "terminal".

The radio feature generation unit 1b generates a radio feature from a received signal received by the receiving unit 1a. For example, the radio feature generation unit 1b can generate a radio feature by extracting a specific signal region (a specific frequency region, a region with a specific intensity, or the like) from the received signal, and can also include a process or the like for generating a spectrogram of the received signal when generating the radio feature. However, regardless of the generation method of the radio feature, it suffices that a radio feature, which enables the generation of a sample feature that can be compared with a template feature in the degree-of-similarity calculation unit 1d at the rear stage, can be generated from the received signal.

The storage unit 1c stores K sets of template feature groups for estimating K kinds of information indicative of the transmission terminal, K being an integer of 2 or more. The number of template features included in each set may be basically at least one, and may be different or equal between the sets. In addition, as is understood from the function of the degree-of-similarity calculation unit 1d to be described later, the kind of information that is a recognition target is different between the sets, and the kinds include, for example, an individual, a model, and an attribute. It should be noted, however, that a template feature may be stored as one shared between a plurality of sets, for example, such that a template feature included in a certain set becomes a template feature included in another set.

In addition, a template feature group of a certain set is composed of one or more template features which are correlated in advance with one or more information pieces that are of the same kind and are different. For example, when K=3, and a first set, a second set and a third set are a set for individual estimation, a set for model estimation and a set for attribute estimation, respectively, each set can be composed in the following manner. The first set is composed of one or more template features which are correlated with information indicative of the individual of the transmission terminal. It suffices that a correlated template feature is stored in such a manner as to be capable of identifying information indicative of a certain individual. Similarly, the second set is composed of one or more template features which are correlated with information indicative of the model of the transmission terminal, and the third set is composed of one or more template features which are correlated with information indicative of the attribute of the transmission terminal.

The degree-of-similarity calculation unit $1d$ generates an i-th sample feature from the radio feature, and calculates an i-th degree-of-similarity group that is degrees of similarity between the i-th sample feature and template features included in an i-th set of the template feature group. The generated sample feature can indicate a feature of a lower order than the radio feature. Here, it is assumed that i is an integer of 1 to K, and the degree-of-similarity calculation unit $1d$ generates K sample features, and calculates K sets of degree-of-similarity groups. A degree-of-similarity group of a certain set, which is calculated, is composed of the same number of degrees of similarity as the number of template features included in the template feature group of this set.

In addition, since the result of calculation of the degrees of similarity to the template features is indicative of a recognition result for each kind, the degree-of-similarity calculation unit $1d$ can be referred to as a recognition unit.

The summed degree-of-similarity calculation unit $1e$ calculates a summed degree of similarity by executing a process including a weighted-summing process. The weighted-summing process is a process of selecting, one by one, the degrees of similarity included in the i-th degree-of-similarity group, with respect to 1 to K of i, and weighted-summing the degrees of similarity included in the i-th degree-of-similarity group by an i-th weighting factor with respect to K selected degrees of similarity in total. In addition, the process including the weighted-summing process may be the weighted-summing process itself, or a process (i.e. weighted mean process) of averaging the results of the weighted-summing process by the total number of weighting factors, or may be some other process.

The estimation unit if estimates, with respect to K template features that are calculation sources of K degrees of similarity having the summed degree of similarity that is highest, that K information pieces in total correlated in advance with the K template features are information indicative of the transmission terminal that transmitted the received signal. In addition, the transmission apparatus recognition apparatus 1 can output the result of the estimation as a recognition result. Note that the estimation unit if has a function of correcting respective recognition results (recognition results for the respective kinds) indicated by the calculation results in the degree-of-similarity calculation unit $1d$, the estimation unit if can also be referred to as a recognition result correction unit.

Here, in the present example embodiment, the K sets of template feature groups stored in the storage unit $1c$ satisfies the following condition. Specifically, it is assumed that the K sets include a set of a template feature group indicative of a predetermined kind, and a set of a template feature group indicative of one or more kinds, the information of which can be determined by the information of the predetermined kind. In other words, the K sets includes a set of a template feature group indicative of a kind, the information of which can be determined by information of another kind.

A description will be given of an example in which K=3, and the kinds are the individual, the model and the attribute. Here, the "attribute" indicates, for example, the kind of apparatus, such as a smartphone or a laptop PC, and may be the kind corresponding to, for example, the purpose of use or the mode of use, or may also indicate the kind of communication carrier. In addition, in this example, the K sets of template feature groups include all of the feature group indicative of the individual of the transmission terminal, the feature group indicative of the model of the transmission terminal, and the feature group indicative of the attribute of the transmission terminal. However, depending on at which level the transmission terminal needs to be recognized, the K sets of template feature groups may include only at least one of these feature groups.

In this example, (A) the individual corresponds to the above-described predetermined kind, and the model and the attribute correspond to the above-described one or more other kinds, and (B) the model corresponds to the above-described predetermined kind, and the attribute corresponds to the above-described one or more other kinds. Like this example, it is preferable that each of the stored K sets is either the set of the template feature group indicative of the predetermined kind, or the set of the template feature group indicative of one or more other kinds, the information of which can be determined by the information of the predetermined kind. The former set is a set which can determine the information of the other kind by the information of the kind indicative of this set. Note that, as regards the kind for which this relationship is not established, this kind may be excluded from the processing target in the estimation unit $1f$, and recognition may be executed by another path, and the recognition of this kind may be limited to, for example, the recognition in the degree-of-similarity calculation unit $1d$.

In this manner, the transmission apparatus recognition apparatus 1 corrects a single-unit degree of similarity (a certain one of two or more similarities) of one or more degrees of similarity by the weighted-summing of two or more degrees of similarity. Thereby, the transmission apparatus recognition apparatus 1 can reduce a decrease in identification accuracy, even in a situation in which the results of estimation of two or more kinds of information do not agree, for example, as in a case where the SNR is low or in a case of a situation in which the surrounding environment of the receiver is greatly different from the surrounding environment at the time of learning. Note that the identification accuracy is also referred to as recognition accuracy or estimation accuracy.

Specifically, in the present example embodiment, when a plurality of kinds of information indicative of a transmission terminal of a recognition target are estimated from a signal wirelessly transmitted from the transmission terminal, it is possible to reduce a situation in which inconsistency occurs between the estimation results of the kinds, that is, to correct the inconsistency. As a result, in the present example embodiment, a decrease in recognition accuracy in this situation can be reduced.

As described above, the transmission apparatus recognition apparatus 1 according to the present example embodiment is an apparatus which recognizes a transmission source by using a signal wirelessly transmitted from a transmission terminal (a radio wave received from the transmission terminal), and can also be referred to as a radio wave sensor apparatus or a recognition processing apparatus. It should be noted, however, that an apparatus, which unintendedly transmits a radio wave as described above, can be included in the transmission terminal.

Second Example Embodiment

Figure 2:
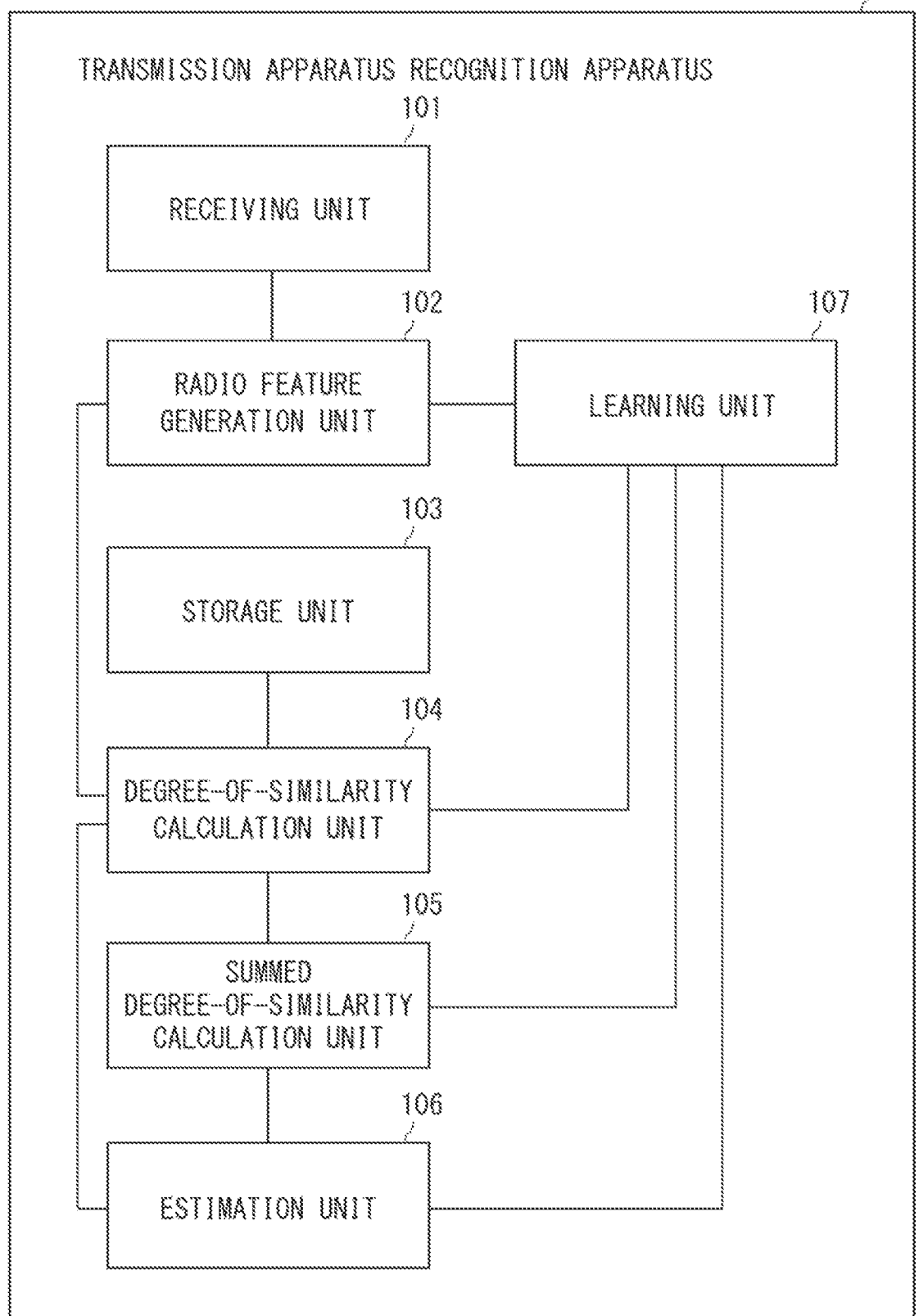
FIG. 2 is a block diagram for explaining an outline of a transmission apparatus recognition apparatus according to a second example embodiment.

A second example embodiment will be described focusing on differences from the first example embodiment with reference to FIGS. 2 to 9. Also in the second example embodiment, various examples described in the first example embodiment can be applied. To begin with, an outline of a transmission apparatus recognition apparatus according to the present example embodiment will be described with reference to FIG. 2. FIG. 2 is a block diagram for explaining the outline of the transmission apparatus recognition apparatus according to the present example embodiment. Note that the reference numerals of the drawing added to this outline are added to each element for convenience as an example for assisting understanding, and the description of this outline is not intended to limit anything.

As shown in FIG. 2, the transmission apparatus recognition apparatus 10 according to this example embodiment includes a receiving unit 101 corresponding to the receiving unit 1a of FIG. 1 and a radio feature generation unit 102 corresponding to the radio feature generation unit 1b of FIG. 1, and can also include the following components. That is, the transmission apparatus recognition apparatus 10 can include a storage unit 103, a degree-of-similarity calculation unit 104, a summed degree-of-similarity calculation unit 105 and an estimation unit 106, which correspond to the storage unit 1c, degree-of-similarity calculation unit 1d, summed degree-of-similarity calculation unit 1e and estimation unit 1f of FIG. 1, respectively.

The transmission apparatus recognition apparatus 10 executes a degree-of-similarity calculation with respect to a sample feature generated from a radio wave transmitted from a transmission terminal (not shown), and a template feature group prestored in the internal storage unit 103, and recognizes the transmission terminal, based on the result of the calculation. A plurality (three in this example) of sample features can be generated based on an individual difference of radio waves, a model difference, and an attribute difference, and the degrees of similarity to template feature groups indicative of these differences are calculated. Note that "recognize" can be expressed in different words such as "estimate", "determine", "decide" and the like. In addition, K (K=3 in the example of the individual, model and attribute) sets of template feature groups can be stored in the storage unit 103, and it is preferable that the K sets of template feature groups are registered in a database form.

Here, the individual difference of radio waves and the like will be described. Individual differences may occur in the radio waves to be transmitted, due to differences in the specifications of the transmission terminal, or even if the specifications are the same, due to variations in the characteristics of the analog circuit mounted on the transmission terminal. For each transmission terminal, the transmission apparatus recognition apparatus 10 registers the feature of the radio wave transmitted by the transmission terminal as a template feature in the database (storage unit 103). Then, when the transmission apparatus recognition apparatus 10 receives the radio wave, it generates a sample feature of the received signal.

The transmission apparatus recognition apparatus 10 calculates the degrees of similarity between the sample feature and the template features in the database, and can estimate, based on the result of the calculation, the transmission terminal that transmits the received radio wave. When there is a template feature with a degree of similarity which is greater than a predetermined threshold value (recognition threshold value), the transmission apparatus recognition apparatus 10 can estimate that the terminal corresponding to this template feature is the transmission terminal that is the transmission source of the received radio wave, and can output the estimation result. For example, when there are a plurality of template features with degrees of similarity which are greater than the predetermined recognition threshold value, the transmission apparatus recognition apparatus 10 can output, as an estimation result, a terminal corresponding to the template feature that is the calculation source of the highest degree of similarity among the template features. Alternatively, in this case, the transmission apparatus recognition apparatus 10 may output two or more, and a predetermined number or less of, candidates together with the estimated probability.

The recognition of the transmission terminal includes "individual identification" that determines the individual of the transmission terminal. In addition, the determination of the transmission terminal also includes "model identification" that does not determine which individual transmits the radio wave but that determines the model that transmits the radio wave, and "attribute estimation" that determines the attribute of the transmission of the radio wave (the difference between a smartphone, a tablet terminal, a laptop PC, and the like). However, the information that can be used for determining the transmission terminal is not limited to these kinds of information. In view of this situation, in the following description, "individual identification", "model identification" and "attribute estimation" may be collectively referred to as "radio wave identification" or "terminal recognition".

The transmission apparatus recognition apparatus 10 is required to be capable of extracting the radio feature that is the feature of the received radio wave (received radio signal), and the transmission terminal does not need to transmit radio waves to the transmission apparatus recognition apparatus 10 (toward the transmission apparatus recognition apparatus 10). The transmission apparatus recognition apparatus 10 can be utilized (applied) for various purposes such as detection and tracking of suspicious persons in urban areas and various facilities (airports, shopping malls, etc.), understanding of the lines of flow of customers in stores and commercial facilities, and entrance/exit management to limited areas using radio waves. In addition, the transmission apparatus recognition apparatus 10 can also be utilized, for example, for searching for an interference signal transmission source for important wireless communication.

The transmission apparatus recognition apparatus 10 can determine the identity of the transmission terminal by using the radio feature. However, the transmission apparatus recognition apparatus 10 cannot directly determine the owner of the transmission terminal, based on the radio feature. As described above, the radio feature used by the transmission apparatus recognition apparatus 10 has anonymity, and the transmission apparatus recognition apparatus 10 can perform processing in consideration of the privacy of individuals.

Hereinafter, each component of the transmission apparatus recognition apparatus 10 shown in FIG. 2 will be described.

The receiving unit 101 receives a signal from the transmission apparatus. The radio feature generation unit 102 generates a radio feature from a received signal that is received by the receiving unit 101. The storage unit 103 stores K sets of template feature groups for estimating K kinds of information indicative of the transmission terminal.

The degree-of-similarity calculation unit 104 generates an i-th sample feature from a radio feature, and calculates an i-th degree-of-similarity group that is degrees of similarity between the i-th sample feature and template features included in an i-th set of the template feature group. The summed degree-of-similarity calculation unit 105 calculates a summed degree of similarity by executing a process including a weighted-summing process by using K weighting factors.

In the present example embodiment, among the K weighting factors used in the summed degree-of-similarity calculation unit 105, weighting factors corresponding to the above-described predetermined kind and the above-described on one more other kinds can be set to be values normalized in the following manner. Specifically, the weighting factors can be set to values normalized such that, with respect to each of the above-described predetermined kind and the above-described on one more other kinds, an accuracy, which is a value acquired by subtracting, from 1, an error rate that is a rate of an error of an estimation result, is calculated, the calculated accuracies are normalized. The normalization is executed such that the rate of each accuracy to the sum of the accuracies becomes 1. Note that the error rate used here can be calculated by using a value that is calculated when the transmission terminal is known in an operation or in a test operation. In particular, when the calculation of the degree of similarity and the summed degree of similarity, or the like, is executed by using a learning model which will be described later, the calculation of the error rate can easily be executed at the time of learning, and therefore this normalization based on the error rate is advantageous.

In the example described in the first example embodiment, in which K=3 and the kinds are the individual, the model and the attribute, for example, it is possible to use three weighting factors normalized with respect to (A), and to use two weighting factors normalized with respect to (B) and a weighting factor relating to the individual. Alternatively, it is possible to use three weighting factors normalized with respect to (B) after the normalization with respect to (A), or to use three weighting factors normalized with respect to (A) after the normalization with respect to (B).

The error rate will be described by taking an example in which three weighting factors are normalized with respect to (A). In this case, accuracies are calculated for an error rate of an error in the same model (i.e. in the same attribute) when the individual is estimated, an error rate of an error in the same attribute when the model is estimated, and an error rate of an error when the attribute is estimated, and these three accuracies are normalized. As described above, the normalization can be executed such that the rate of each accuracy to the sum of the three accuracies becomes 1.

Like this example, it is preferable that the accuracies calculated from the error rates of the kinds having the inclusive relation are normalized, and the weighting factors of the normalized accuracies are calculated.

The estimation unit 106 estimates, with respect to K template features that are calculation sources of K degrees of similarity having the summed degree of similarity that is highest, that K information pieces in total correlated in advance with the K template features are information indicative of the transmission terminal that transmitted the received signal. In addition, the transmission apparatus recognition apparatus 10 can output this estimation result.

As shown in FIG. 2, the transmission apparatus recognition apparatus 10 can further include a learning unit 107. The learning unit 107 generates a learning model which inputs therein the radio feature and outputs, from the radio feature, a parameter (conversion parameter) for generating an i-th sample feature and an i-th weighting factor. The conversion parameter is a parameter that is learned in order to generate the i-th sample feature used for calculation (comparison) of degrees of similarity to an i-th template feature group, and K sets of conversion parameters in total are generated. Note that the conversion parameter can also be referred to as a learning parameter.

As described above, the learning unit 107 can execute, using the learning model, the generation of the parameter for extracting a lower-order feature (sample feature) from the radio feature, and the calculation of the weighting factor of the summed degree of similarity. Note that, although the algorithm or the like of the learning model is not particularly limited, training information is basically included in a training data set, and an algorithm suitable for the data set can be used. In addition, the learning unit 107 can use the estimation result of the estimation unit 106 as a part of the training data set.

The degree-of-similarity calculation unit 104 calculates the i-th sample feature from the radio feature, by using the generated learning parameter. In addition, the summed degree-of-similarity calculation unit 105 calculates the summed degree of similarity by using the generated weighting factor. Also when the transmission apparatus recognition apparatus 10 includes the learning unit 107, the estimation unit 106 estimates that the K information pieces in total, which are correlated in advance with the K template features that are calculation sources of K degrees of similarity having the summed degree of similarity that is highest, are the information indicative of the transmission terminal.

Here, the estimation unit 106 can also estimate that, among the K information pieces, only the information corresponding to a degree of similarity, which exceeds a corresponding threshold value among the K degrees of similarity having the highest summed degree of similarity, is the information indicative of the transmission terminal that transmitted the received signal. Specifically, the estimation unit 106 may not output the information corresponding to a degree of similarity, which does not exceed the threshold value, as an estimation result, but may output only the information corresponding to a degree of similarity, which exceeds the threshold value, as an estimation result.

Alternatively, the degree-of-similarity calculation unit 104 can be composed as a recognition unit, thereby to execute a threshold value process of comparing the calculated degree of similarity with a threshold value (recognition threshold value) for recognition. For example, in a case where the degree of similarity is equal to or higher than the recognition threshold value, the degree-of-similarity calculation unit 104 can regard this case as a case in which the recognition is successful for the information corresponding to this degree of similarity. When the calculation in the summed degree-of-similarity calculation unit 105 and the estimation in the estimation unit 106 are executed, a recognition result may be output which indicates that the recognition is successful for only the information overlapping the estimation result in the estimation unit 106. In this case, eventually, the recognition result in the degree-of-similarity calculation unit 104 is corrected by the estimation result in the estimation unit 106.

In addition, the estimation unit 106 can include a determination unit (not shown) which executes determination of the estimation result. The determination unit sets, as a determination target, such an estimation result that, as regards K template features which are calculation sources of K degrees of similarity having the summed degree of similarity that is highest, K information pieces, which are correlated in advance with the K template features, are the information indicative of the transmission terminal which transmitted the received signal. Specifically, the determination unit determines whether consistency is present between the K information pieces in the above-described result. In addition, when the determination unit determines that consistency is absent, the estimation unit 106 can output a result to the effect that the estimation failed. Alternatively, in this case, the estimation unit 106 estimates that information having no consistency with the information correlated in advance with the template feature, which is a calculation source of the highest degree of similarity among the K degrees of similarity having the highest summed degree of similarity, is not the information indicative of the transmission terminal that transmitted the received signal. Thereby, the estimation unit 106 can output only the information with consistency as the estimation result.

Figure 3:
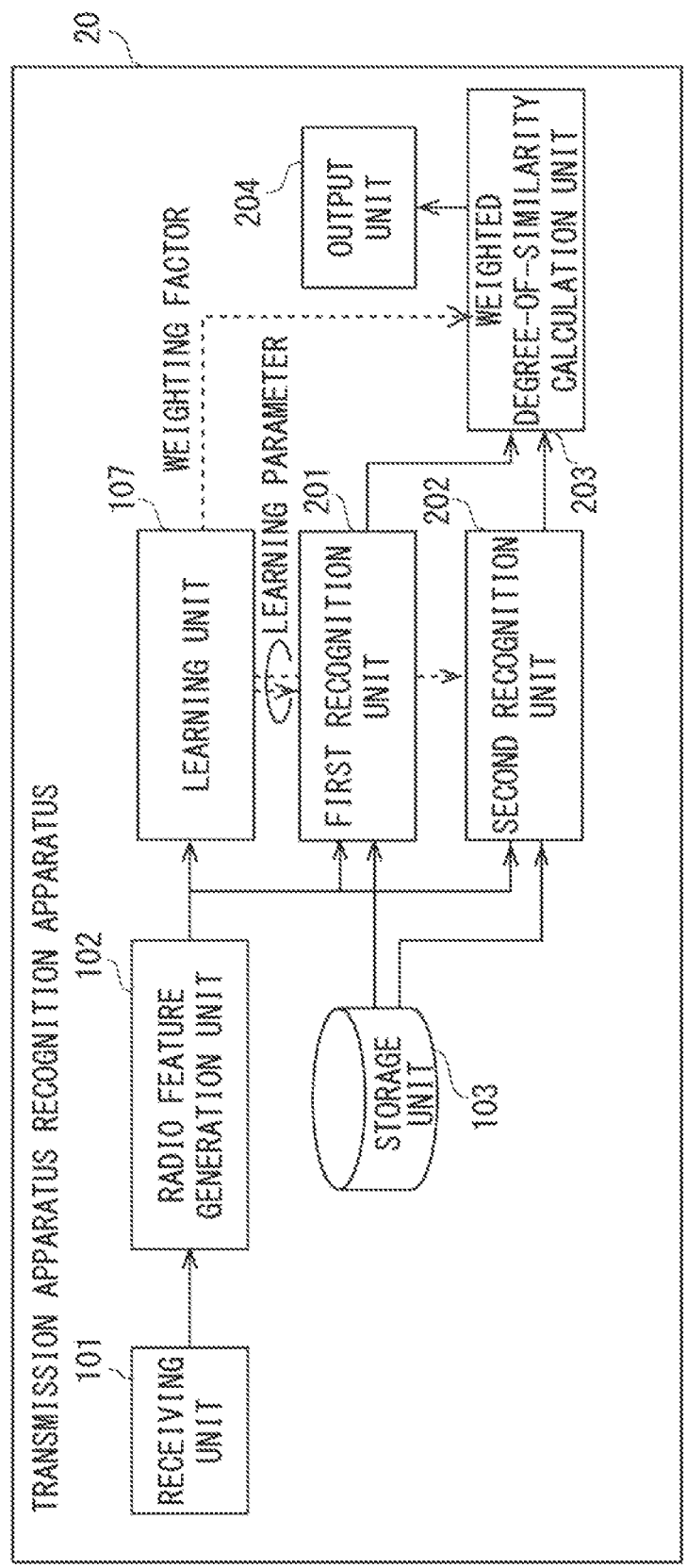
FIG. 3 is a block diagram showing an example of a functional configuration of the transmission apparatus recognition apparatus according to the second example embodiment.
Figure 4:
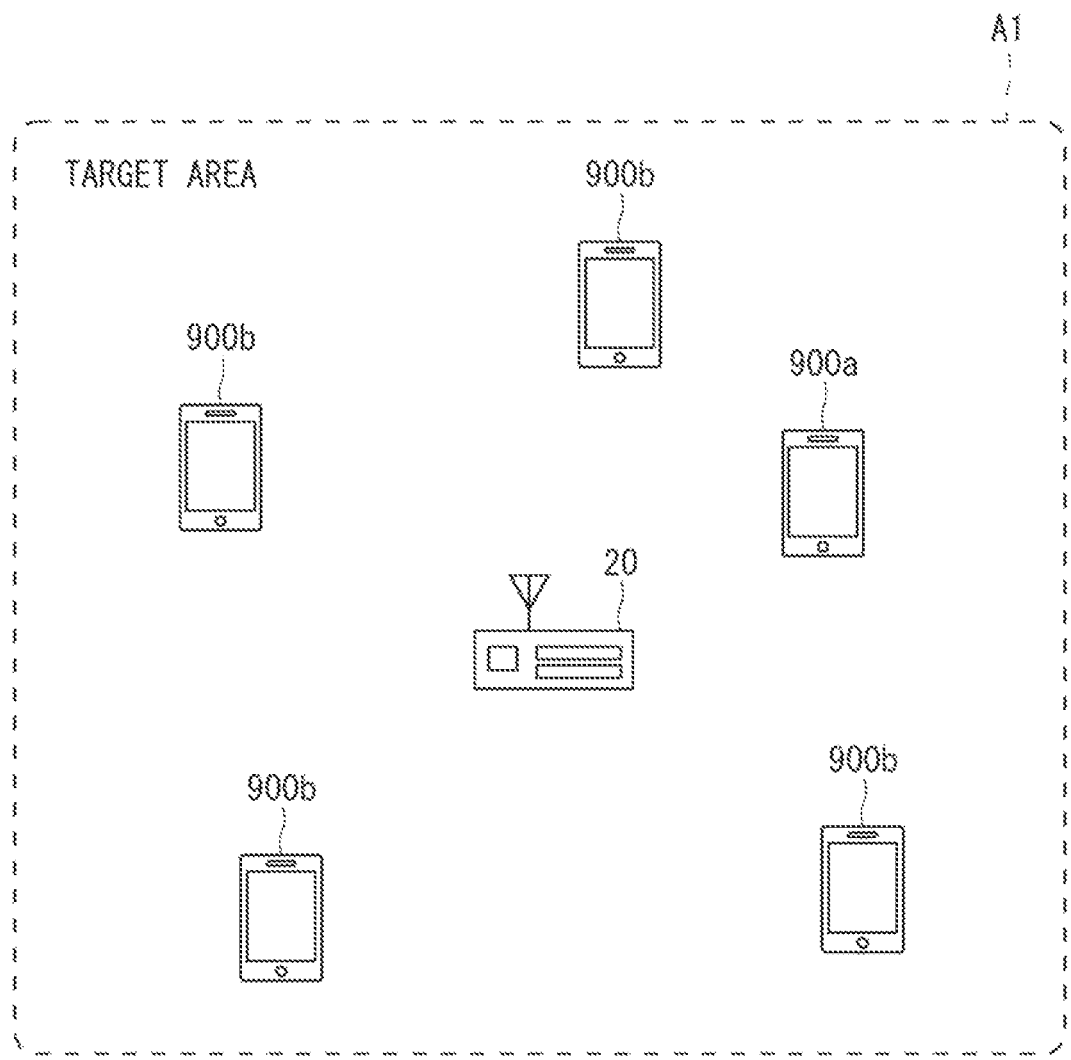
FIG. 4 is a diagram showing an arrangement example of the transmission apparatus recognition apparatus according to the second example embodiment and a transmission apparatus that is a recognition target.

Hereinafter, one of more specific examples of the present example embodiment will be described in detail with reference to FIG. 3 to FIG. 9. To begin with, referring to FIG. 3 and FIG. 4, an example of the configuration and arrangement of the transmission apparatus recognition apparatus 10 will be described. FIG. 3 is a block diagram showing an example of a functional configuration of the transmission apparatus recognition apparatus 10, and FIG. 4 is a diagram showing an arrangement example of the transmission apparatus recognition apparatus 10 and a transmission apparatus that is a recognition target. Note that, of the components shown in FIG. 3, those having the same names as the components described in FIGS. 1 and 2 have basically the same functions.

Hereinafter, a transmission apparatus recognition apparatus 20 shown in FIG. 3, which is a configuration example of the transmission apparatus recognition apparatus 10, is described. The transmission apparatus recognition apparatus 20 can include a receiving unit 101, a radio feature generation unit 102, a storage unit 103, a learning unit 107, a first recognition unit 201, a second recognition unit 202, a weighted degree-of-similarity calculation unit 203, and an output unit 204. Here, the weighted degree-of-similarity calculation unit 203 is an example of the summed degree-of-similarity calculation unit 105, and the output unit 204 is an example of the estimation unit 106.

The components of the transmission apparatus recognition apparatus 20 will be described in detail.

The receiving unit 101 receives radio waves (wireless signals) from transmission terminals including a transmission terminal that is a target of radio wave identification. Note that the number of receiving units 101 included in the transmission apparatus recognition apparatus 20 may be one or more. In other words, it suffices that the transmission apparatus recognition apparatus 20 includes at least one receiving unit 101.

Here, an arrangement example of the transmission apparatus recognition apparatus 20, which includes the receiving unit 101, and the transmission terminals will be described with reference to FIG. 4. In the example of FIG. 4, there are shown the transmission apparatus recognition apparatus 20 and transmission terminals 900a and 900b arranged in a target area A1 of the terminal recognition by the transmission apparatus recognition apparatus 20. Here, the transmission terminal 900a is a transmission terminal to be recognized by the transmission apparatus recognition apparatus 20, and the transmission terminals 900b are transmission terminals not to be recognized by the transmission apparatus recognition apparatus 20. In the present disclosure, unless there is a particular reason for distinguishing between the transmission terminal 900a and the transmission terminal 900b, they are simply referred to as "transmission terminal 900". Note that, although FIG. 4 illustrates one transmission terminal 900a to be recognized, actually, a plurality of transmission terminals 900a to be recognized are included. That is, there may be at least one or more transmission terminals 900a in the field (target area). In addition, FIG. 4 does not illustrate a receiving apparatus (a wireless communication base station, an access point, and the like, which will be described later) of a radio wave transmitted by the transmission terminal.

Examples of the transmission terminal 900 include mobile terminal apparatuses such as mobile phones (including those called smartphones), game machines, and tablet terminals, and computers (personal computers, laptop computers). Alternatively, examples of the transmission terminal 900 may include an IoT (Internet of Things) terminal, and an MTC (Machine Type Communication) terminal that transmit radio waves. However, the transmission terminals 900 (including the target of terminal recognition by the transmission apparatus recognition apparatus 20) is not limited to the above examples. That is, in the present disclosure, any apparatus that transmits radio waves can be a target of terminal recognition by the transmission apparatus recognition apparatus 20.

As described above, the radio wave transmitted by the transmission terminal 900a does not need to be the radio wave transmitted to the transmission apparatus recognition apparatus 20 (to the receiving unit 101). For example, the receiving unit 101 may receive radio waves transmitted by the transmission terminal 900 toward a wireless communication base station or an access point for a mobile phone or the like, or radio waves transmitted by the transmission terminal 900 to search for wireless communication base stations and access points. Alternatively, the receiving unit 101 may receive radio waves emitted by an interference signal transmission source (LED bulb inverter or fluorescent lamp) for important wireless communication.

The description now returns to the details of the components of FIG. 3. The radio feature generation unit 102 generates a radio feature from the received signal that is received by the receiving unit 101. The radio feature used by the transmission apparatus recognition apparatus 20 for recognition of the transmission terminal of the radio wave transmission source can be various features in which individual differences of the transmission terminal 900 appear.

Examples of the radio feature include power spectral densities and spectrograms of transients (rising and falling edges) and a reference signal part such as a preamble, of the received signal in the receiving unit 101. The radio features include the processing results of the continuous wavelet transform (CWT) and the Hilbert transform. Furthermore, the radio features include the error vector magnitude (EVM) of the received signal. In addition, examples of the radio feature include the amplitude and phase error of the IQ (in-phase/quadrature phase) signal, the IQ imbalance amount. Alternatively, the radio features to be used may include a feature indicating one or more of the frequency offsets and the symbol clock error. However, the examples of the radio feature here are not intended to limit the radio features used by the transmission apparatus recognition apparatus 20 to determine the transmission terminal.

The storage unit 103 in the transmission apparatus recognition apparatus 20 stores two sets of template feature groups for estimating two kinds of information (individual, model) indicative of the transmission terminal. Similarly in the following description, for the purpose of simple description, an example will be described in which the K sets of template feature groups stored in the storage unit 103 are a first template feature group for individual estimation and a second template feature group for model estimation, and K=2. Hereinafter, it is assumed that the numbers of template features included in the first and second template feature groups stored in the storage unit 103 are $N_1$ and $N_2$, respectively, and N ($=N_1+N_2$) template features in total are stored in the storage unit 103. Note that each of $N_1$ and $N_2$ is an integer of 1 or more, and N is also an integer. In addition, if following the above-described example, the K kinds of information to be estimated in the following example are the information indicative of the individual and the information indicative of the model. However, the K kinds stored in accordance with K kinds to be estimates are not limited to the two kinds, namely the individual and the model.

The learning unit 107 inputs therein, for example, the radio feature generated by the radio feature generation unit 102 and a label (training information of the individual or the model), and generates a learning parameter by learning by various supervised learning algorithms of machine learning, deep learning or the like. In addition, the learning unit 107 calculates a probability of an error between different models among error rates of individual estimation at the time of learning, or an error rate of model estimation, and calculates two weighting factors, based on the calculated probability or the calculated error rate. The two calculated weighting factors are factors used in the calculation of the summed degree of similarity in the weighted degree-of-similarity calculation unit 203, and one of the weighting factors is a weighting factor by which the degree of similarity for the individual is weighted, and the other is a weighting factor by which the degree of similarity for the model is weighted.

The first recognition unit 201 is a unit which calculates degrees of similarity for the individual as an example of the first kind in the degree-of-similarity calculation unit 104, and is configured to be capable of executing a process up to the threshold value process for the calculated degrees of similarity.

Based on the learning parameter learned in the learning unit 107, the first recognition unit 201 generates a first sample feature from the radio feature generated by the radio feature generation unit 102. Next, the first recognition unit 201 calculates degrees of similarity of 1 to $N_1$ between the generated first sample feature and the $N_1$ template features registered in the database in the storage unit 103, and calculates degrees of similarity (referred to as first degrees of similarity).

The second recognition unit 202 is a unit which calculates degrees of similarity for the model as an example of the second kind in the degree-of-similarity calculation unit 104, and is configured to be capable of executing a process up to the threshold value process for the calculated degrees of similarity.

Based on the learning parameter learned in the learning unit 107, the second recognition unit 202 similarly generates a second sample feature from the radio feature generated by the radio feature generation unit 102. Next, the second recognition unit 202 calculates degrees of similarity of 1 to $N_2$ between the generated second sample feature and the $N_2$ template features registered in the database in the storage unit 103, and calculates degrees of similarity (referred to as second degrees of similarity).

In addition, in the configuration example of FIG. 3, the first recognition unit 201 and the second recognition unit 202 are provided in parallel, and execute processes, respectively. Specifically, the configuration example of FIG. 3 illustrates an example in which the degree-of-similarity calculation unit 104 in the example of FIG. 2 is configured to calculate an i-th sample feature from the radio feature by parallel processing with respect 1 to K of i. However, only one recognition unit may be provided, and may be configured to execute a first recognition process and a second recognition process in a serial manner by switching the learning parameter. In other words, the degree-of-similarity calculation unit 104 of FIG. 2 may also be configured to calculate an i-th sample feature from the radio feature in order with respect to 1 to k of i.

Examples of what is used for calculating the degree of similarity between the sample feature and the template feature may include cosine similarity, Euclidean score, and correlation coefficient. That is, the degree of similarity calculated by the first recognition unit 201 and second recognition unit 202 can be any one of the cosine similarity, the Euclidean score, and the correlation coefficient, or it can be a combination of a plurality of them. Note that the degree of similarity can be calculated as a degree-of-similarity score.

Specifically, when two L-dimensional feature vectors are $<p>=(p_1, \ldots, p_L)$ and $<q>=(q_1, \ldots, q_L)$, the cosine similarity is expressed by expression (1), the Euclidean score is expressed by expression (2), and the correlation coefficient is expressed by expression (3). Note that, here, $<p>$ is a notation of a vector of p, and $<q>$ is a notation of a vector of q for convenience. In addition, the notations of the superscript bars of p and q in the expression (3) are expressed by expressions (4) and (5), respectively.

[Expression 1]

$$S_{cos} = \frac{\sum_{i=1}^{L} p_i q_i}{\sqrt{\sum_{i=1}^{L} p_i^2} \sqrt{\sum_{i=1}^{L} q_i^2}} \quad (1)$$

$$S_{euclid} = \frac{1}{1 + \sqrt{\sum_{i=1}^{L} (p_i - q_i)^2}} \quad (2)$$

$$S_{corr} = \frac{\sum_{i=1}^{L} (p_i - \bar{p})(q_i - \bar{q})}{\sqrt{\sum_{i=1}^{L} (p_i - \bar{p})^2} \sqrt{\sum_{i=1}^{L} (q_i - \bar{q})^2}} \quad (3)$$

-continued $$\bar{p} = \sum_{i=1}^{L} p_i \quad (4)$$

$$\bar{q} = \sum_{i=1}^{L} q_i \quad (5)$$

The degree-of-similarity calculation method described here is merely an example, and is not intended to limit the method used by the transmission apparatus recognition apparatus 20 to calculate the degree of similarity. Note that the explanation below is on the assumption in which: the more similar the features are, the higher (closer to 1) degree of similarity is output; and the more different the features are, the lower (closer to 0) degree of similarity is output, but the present example embodiment is not limited to this.

The weighted degree-of-similarity calculation unit 203 calculates a weighted average by weighted-averaging a first degree of similarity and a second degree of similarity, which are calculated by the first recognition unit 201 and second recognition unit 202, respectively, by using weighting factors thereof. The output unit 204 estimates that information (information indicative of the individual and information indicative of the model) corresponding to a degree of similarity, which is the calculation source of a weighted degree of similarity having a highest value among the calculated weighted degrees of similarity, is the information indicative of the transmission terminal, and outputs the estimation result. The output estimation result corresponds to a result obtained by correcting, where necessary, the recognition results in the first recognition unit 201 and second recognition unit 202. Here, the case in which the first recognition unit 201 executes the individual estimation and the second recognition unit 202 executes the model estimation is described as an example, and such a concrete example will subsequently be described, but the example is not limited to this.

In the example below, it is assumed that a degree of similarity (individual degree of similarity), which is calculated by the first recognition unit 201, between the sample feature of individual estimation and the template feature of the individual included in the model corresponding to the estimated individual, is $S_i(I_n)$. In addition, it is assumed that a degree of similarity (model degree of similarity), which is calculated by the second recognition unit 202, between the sample feature of model estimation and the template feature of the model corresponding to the estimated individual, is $S_t(T_m)$. Alternatively, it is assumed that an individual degree of similarity, which is calculated by the first recognition unit 201, between the sample feature of individual estimation and the template feature of the individual included in the estimated model, is $S_i(I_n)$, and a model degree of similarity, which is calculated by the second recognition unit 202, between the sample feature of model estimation and the template feature of the estimated model, is $S_t(T_m)$. In each case, the weighted degree of similarity $S_c(I_n, T_m)$ is expressed by expression (6). On the other hand, in the case of a combination with a template feature that does not satisfy the above condition, the weighted degree of similarity $S_c(I_n, T_m)$ is expressed by expression (7).

Note that, here, in order to reduce the number of times of calculation of expression (6), a combination between the individual and the model, which cannot become both correct answers, is omitted from calculation targets in expression (6), and expression (7) is adopted, as described below.

Specifically, when a weighted degree-of-similarity calculation is executed for a certain individual with a model, an individual degree-of-similarity calculation with a template feature of an individual corresponding to a model that is not the model of this individual is omitted, and also a model degree-of-similarity calculation with a template feature of a model that is not the model of this individual is omitted. Alternatively, when a weighted degree-of-similarity calculation is executed for a certain model with an individual, an individual degree-of-similarity calculation with a template feature of an individual corresponding to a model that is not this model is omitted, and also a model degree-of-similarity calculation with a template feature of a model that is not this model is omitted. However, there is no problem even if the weighted degrees of similarity are calculated for all individuals by expression (6).

In expressions (6) and (7), $\lambda_i$ and $\lambda_t$ are weighting factors for weighted-summing the individual degree of similarity (degree of similarity of individual estimation) $S_i$ and the model degree of similarity (degree of similarity of model estimation) $S_t$, and are assumed to satisfy expression (8). In addition, from among all calculated weighted degrees of similarity, an individual and a model corresponding to the degree of similarity having a highest value, as expressed by expression (9), are found and set to be an estimated individual and an estimated model after correction.

[Expression 2]

$$S_c(I_n, T_m) = \begin{cases} \lambda_i \cdot S_i(I_n) + \lambda_t \cdot S_t(T_m) & (6) \\ 0 & (7) \end{cases}$$

$$\lambda_i + \lambda_t = 1 \quad (8)$$

$$\{I^*, T^*\} = \underset{n,m}{\mathrm{argmax}}\, S_c(I_n, T_m) \quad (9)$$

In this manner, by weighted-summing the degree of similarity on the model estimation side and the degree of similarity on the individual estimation side, the order is changed from the degree of similarity of the individual estimation alone, or from the degree of similarity of the model estimation alone. The output unit 204 acquires such a result from the weighted degree-of-similarity calculation unit 203, determines the individual and the model having the highest weighted degree of similarity, and outputs the individual and the model as the information indicative of the transmission terminal, thereby correcting inconsistency of estimation results in the first recognition unit 201 and second recognition unit 202. Thereby, the advantageous effect that a decrease in identification accuracy (recognition accuracy) is reduced can be obtained.

In addition, as an example of a determination method of the weighting factors $\lambda_i$ and $\lambda_t$, a method of determining the weighting factors, based on a recognition accuracy at a time of learning, will be described. When the probability of an error between different models among error rates of individual estimation calculated at the time of learning is $\lambda_i$ and $P_{ei}$, and an error rate of model estimation is $P_{et}$, the respective accuracies are expressed by $1-P_{ei}$ and $1-P_{et}$. The weighting factors at this time are expressed by expressions (10) and (11) in which the ratio of accuracies is normalized to become 1 in total.

[Expression 3]

$$\lambda_i = \frac{1 - P_{ei}}{(1 - P_{ei}) + (1 - P_{et})} \quad (10)$$

$$\lambda_t = \frac{1 - P_{et}}{(1 - P_{ei}) + (1 - P_{et})} \quad (11)$$

Besides, the weighting factors $\lambda_i$ and $\lambda_t$ can also be calculated by numerical calculation by a least squares method or the like.

Hereinafter, an operation example of the above-described transmission apparatus recognition apparatus 20 will be described in detail with reference to flows of FIG. 5 to FIG. 7.

Figure 5:
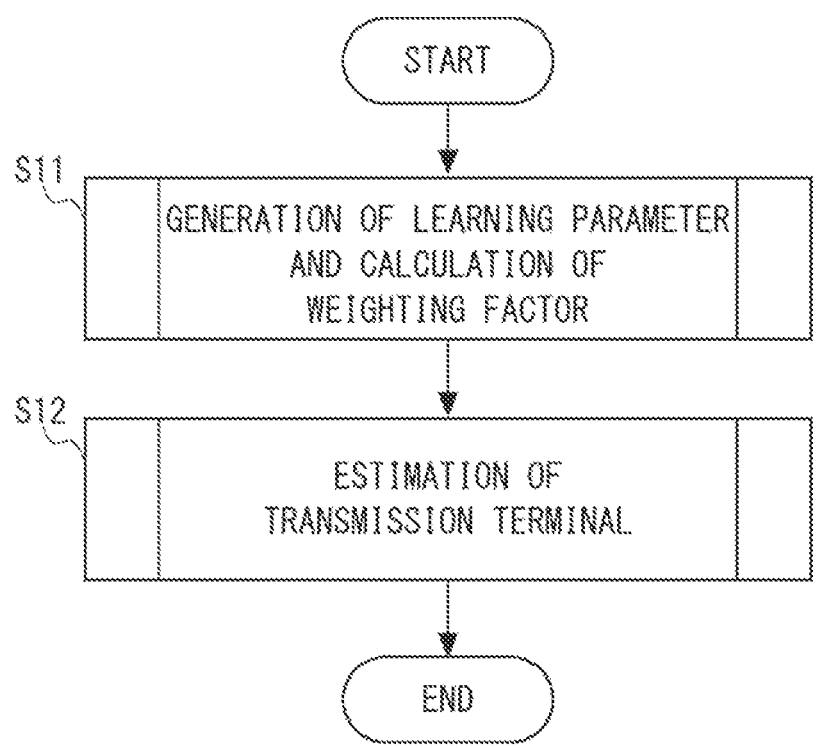
FIG. 5 is a diagram showing an overall flow of an operation example of the transmission apparatus recognition apparatus according to the second example embodiment.

FIG. 5 is a diagram showing an operation example (overall flow) of the transmission apparatus recognition apparatus 20 according to the present example embodiment. The transmission apparatus recognition apparatus 20 executes the generation of learning parameters for the first recognition unit 201 and second recognition unit 202, and the generation of weighting factors for the weighted degree-of-similarity calculation unit 203 (step S11). Then, the transmission apparatus recognition apparatus 20 executes an estimation process of the transmission terminal (step S12).

Figure 6:
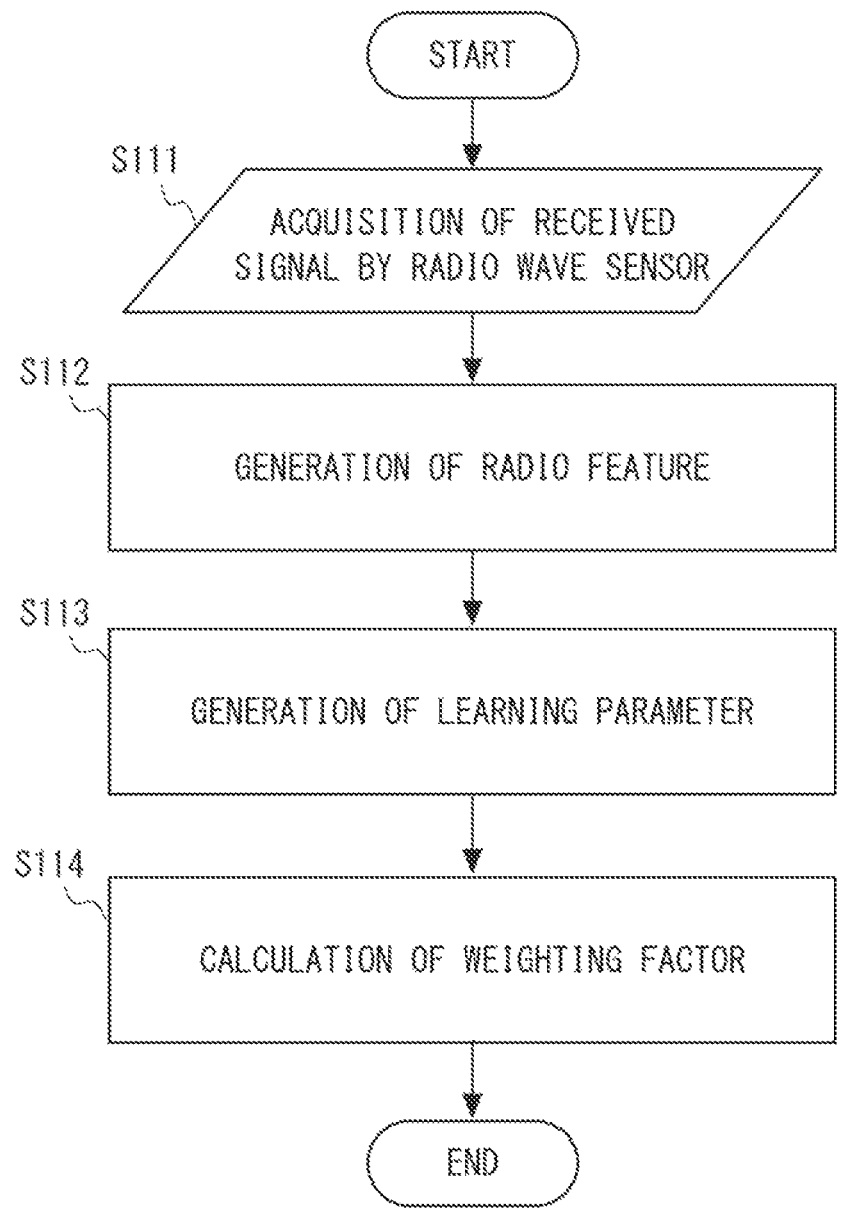
FIG. 6 is a flowchart for explaining a process example relating to learning parameter generation and weighting factor calculation in the second example embodiment.

FIG. 6 is a flowchart for explaining a process example relating to the learning parameter generation and the weighting factor calculation (step S11 of FIG. 5) in the present example embodiment. The process of step S11 is executed in a situation in which the transmission individual can be restricted by some method, and labeling can be performed. The transmission apparatus recognition apparatus 20 receives a signal by the receiving unit (radio wave sensor) 101 (step S11), and generates a radio feature from the received signal (step S112). Then, by inputting the radio feature together with a label, the transmission apparatus recognition apparatus 20 generates learning parameters by various algorithms of machine learning, deep learning or the like (step S113). In addition, the transmission apparatus recognition apparatus 20 calculates weighting factors according to expressions (10) and (11) from the probability of an error between different models among error rates of individual estimation at the time of learning of step S113, and an error rate of model estimation (step S114).

Figure 7:
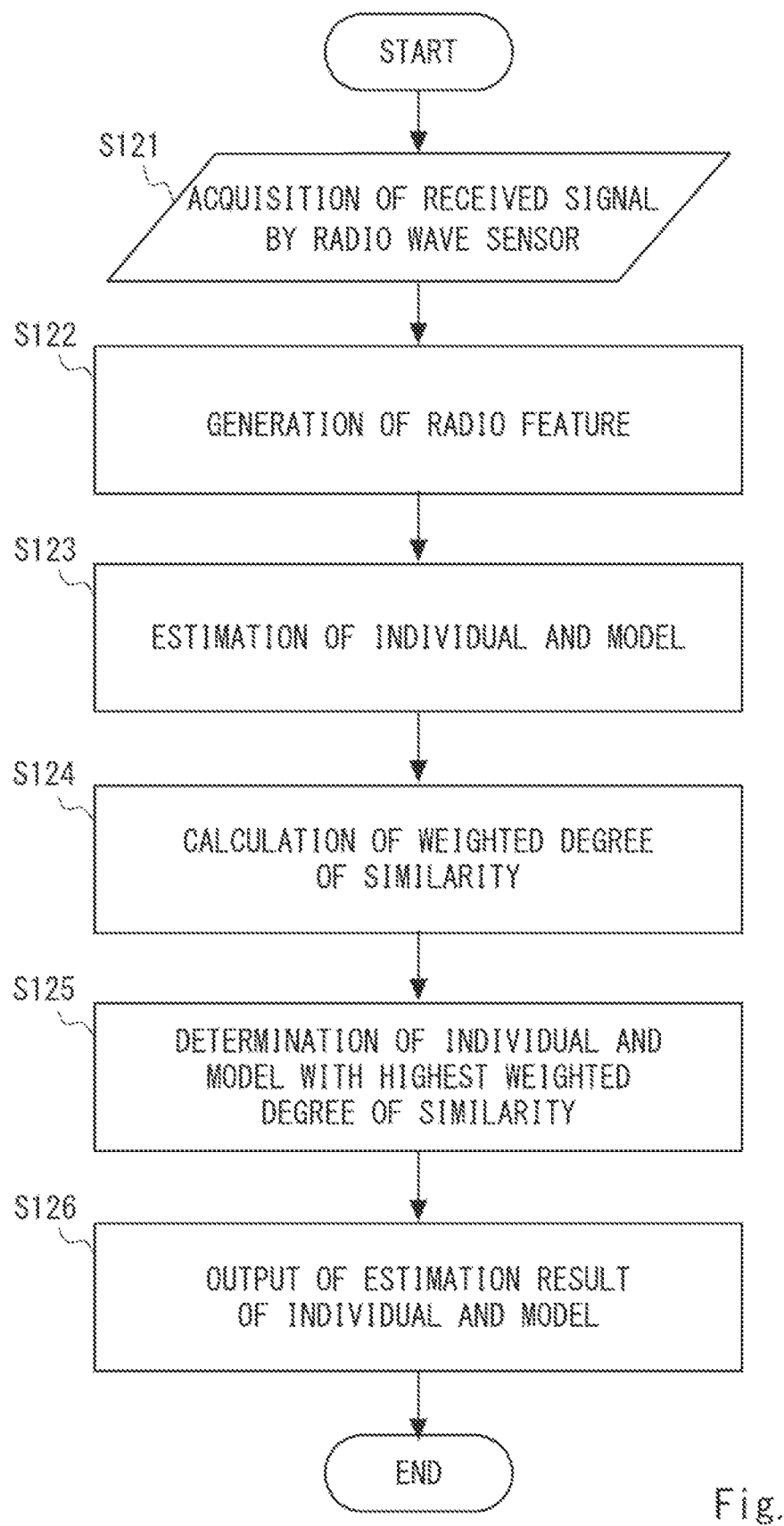
FIG. 7 is a flowchart for explaining an example of a transmission apparatus estimation process in the second example embodiment.

FIG. 7 is a flowchart for explaining an example of a transmission apparatus estimation process (transmission apparatus recognition process; step S12 of FIG. 5) in the present example embodiment. Unlike when the process of step S11 is executed, the process of step S12 does not need to be executed in the situation in which labeling can be performed. The transmission apparatus recognition apparatus 20 receives a signal by the receiving unit 101 (step S121), and generates a radio feature from the received signal (step S122). Then, the transmission apparatus recognition apparatus 20 executes the calculation of degrees of similarity and the estimation processes of the individual and the model in the first recognition unit 201 and the second recognition unit 202, respectively (step S123). Further, the transmission apparatus recognition apparatus 20 calculates, in the weighted degree-of-similarity calculation unit 203, a weighted degree of similarity by weighted-summing the degree of similarity on the individual side and the degree of similarity on the model side (step S124). In addition, the transmission apparatus recognition apparatus 20 determines, in the output unit 204, the individual and model having a highest weighted degree of similarity (step S125), and outputs the estimation result of the individual and model (step S126).

Figure 8:
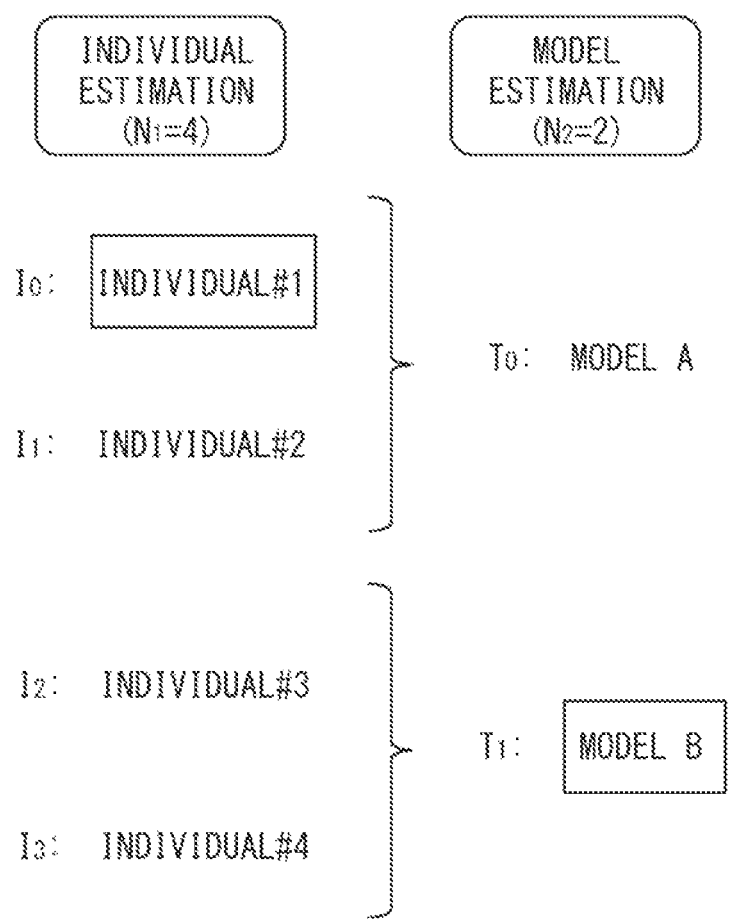
FIG. 8 is a diagram for explaining an example of a summed degree-of-similarity calculation method in the second example embodiment.
Figure 9:
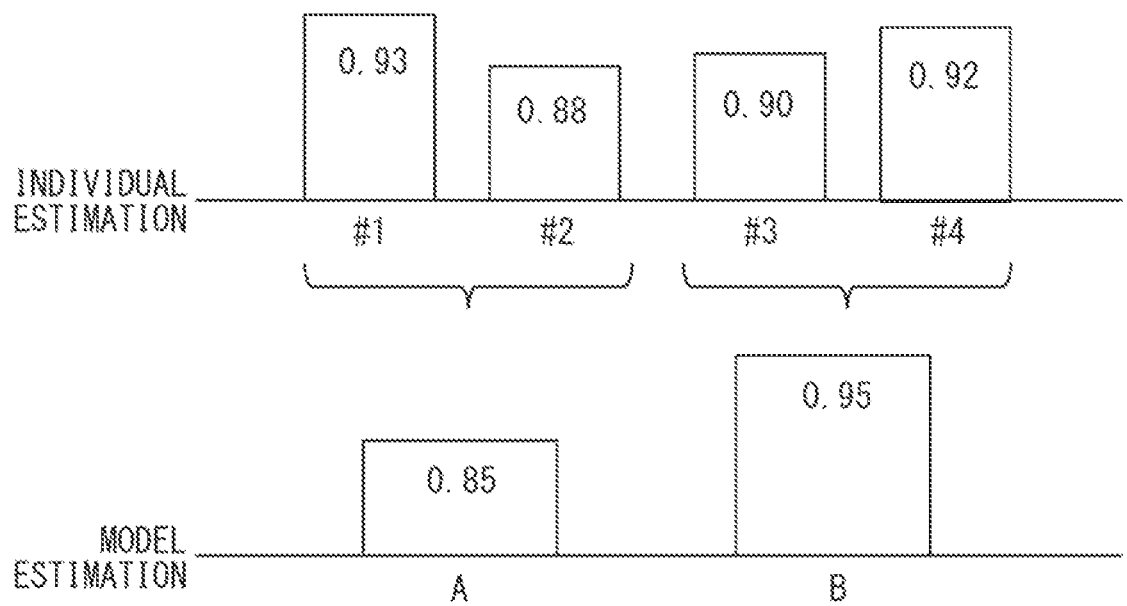
FIG. 9 is a diagram for explaining an example of the summed degree-of-similarity calculation method in the second example embodiment.

Here, a calculation method of the weighted degree of similarity is described with reference to FIG. 8 and FIG. 9, by taking an example of numerical values. FIG. 8 and FIG. 9 are diagrams for explaining an example of the weighted degree-of-similarity calculation method in the present example embodiment.

As illustrated in FIG. 8, it is assumed that a template feature number $N_1$ of individuals registered in the storage unit 103 is 4 ($I_0$~$I_3$), and a template feature number $N_2$ of registered models is 2 ($T_0$~$T_1$). In addition, it is assumed that each of an individual #1 ($I_0$) and an individual #2 ($I_1$) is a model A ($T_0$), and each of an individual #3 ($I_2$) and an individual #4 ($I_3$) is a model B ($T_1$).

To begin with, when error rates of individual estimation and model estimation, which are calculated by the process of step S113 (learning parameter generation) of FIG. 6 are $P_{ei}$=0.05 and $P_{et}$=0.01, the following calculation is executed. Specifically, in the calculation process of weighting factors in step S114, the weighting factors are calculated as $\lambda_i$=0.49 and $\lambda_t$=0.51, respectively, from expressions (10) and (11). Next, according to the estimation process flow of FIG. 7, a recognition process is executed for a currently received signal. It is assumed that the degrees of similarity at the time of the individual estimation by the first recognition unit 201 are $S_i$ ($I_0$)=0.93, $S_i$ ($I_1$)=0.88, $S_i$ ($I_2$)=0.90, and $S_i$ ($I_3$)=0.92. In addition, it is assumed that the degrees of similarity at the time of the model estimation by the second recognition unit 202 are $S_t$ ($T_0$)=0.85, and $S_t$ ($T_1$)=0.95.

In the example of the above presupposed condition, the recognition result of the first recognition unit 201 is the $I_0$ with the highest degree of similarity of individual estimation, that is, the individual #1. On the other hand, the recognition result of the second recognition unit 202 is the $T_1$ with the highest degree of similarity of model estimation, that is, the model B (FIG. 9). However, since the individual #1 is the model A, it can be said that inconsistency occurs.

Thus, the weighted degree-of-similarity calculation unit 203 calculates a weighted degree of similarity $S_c$ ($I_n$, $T_m$) from the first degree of similarity and the second degree of similarity, which are calculated by the first recognition unit 201 and second recognition unit 202, respectively. If the above values are substituted in expressions (6) and (7) and summed, expression (12) is obtained. Note that, although $N_1 \times N_2$ (4×2=8 in this example) weighted degrees of similarity may be calculated, the calculation target of expression (6) is omitted, and expression (7) is adopted for the omitted target. Thus, here, as indicated in expression (12), it is understood that only four weighted degrees of similarity need to be calculated. The weighted degree-of-similarity calculation unit 203 outputs these calculation results to the output unit 204. The output unit 204 finds the individual and the model corresponding to the degree of similarity having the highest value, from expression (12). As a result, the found individual and model are expression (13). Then, the output unit 204 outputs the found individual and model as the estimation result. In this example, as the estimation result of the individual and model, $I_3$ (individual #4) and $T_1$ (model B) are output.

[Expression 4]

$$S_c(I_0, T_0) = \lambda_i \cdot S_i(I_0) + \lambda_t \cdot S_t(T_0)$$
$$= 0.49 \times 0.93 + 0.51 \times 0.85$$
$$= 0.89$$
$$S_c(I_1, T_0) = \lambda_i \cdot S_i(I_1) + \lambda_t \cdot S_t(T_0)$$
$$= 0.49 \times 0.88 + 0.51 \times 0.85$$
$$= 0.86$$
$$S_c(I_2, T_1) = \lambda_i \cdot S_i(I_2) + \lambda_t \cdot S_t(T_1)$$
$$= 0.49 \times 0.90 + 0.51 \times 0.95$$
$$= 0.93$$
$$S_c(I_3, T_1) = \lambda_i \cdot S_i(I_3) + \lambda_t \cdot S_t(T_1)$$
$$= 0.49 \times 0.92 + 0.51 \times 0.95$$
$$= 0.94 \quad (12)$$

$$\{I^*, T^*\} = \arg\max_{n,m} \left\{ \begin{array}{l} S_c(I_0, T_0), S_c(I_1, T_0), \\ S_c(I_2, T_1), S_c(I_3, T_1) \end{array} \right\} \quad (13)$$
$$= \{I_3, T_1\}$$

By the above configuration, the transmission apparatus recognition apparatus 20 according to the present example embodiment calculates at least two kinds of degrees of similarity, and corrects the single-unit degree of similarity (a certain one degree of similarity of two or more kinds of similarities) by weighted-summing the at least two kinds of degrees of similarity. Thereby, the transmission apparatus recognition apparatus 20 can obtain the advantageous effect that the decrease in identification accuracy (recognition accuracy) is reduced, for example, even in the case where the SNR is low, or in the situation in which the results of estimation of the above two or more kinds of information do not agree since the surrounding environment of the receiver is greatly different from the surrounding environment at the time of learning.

Third Example Embodiment

Figure 10:
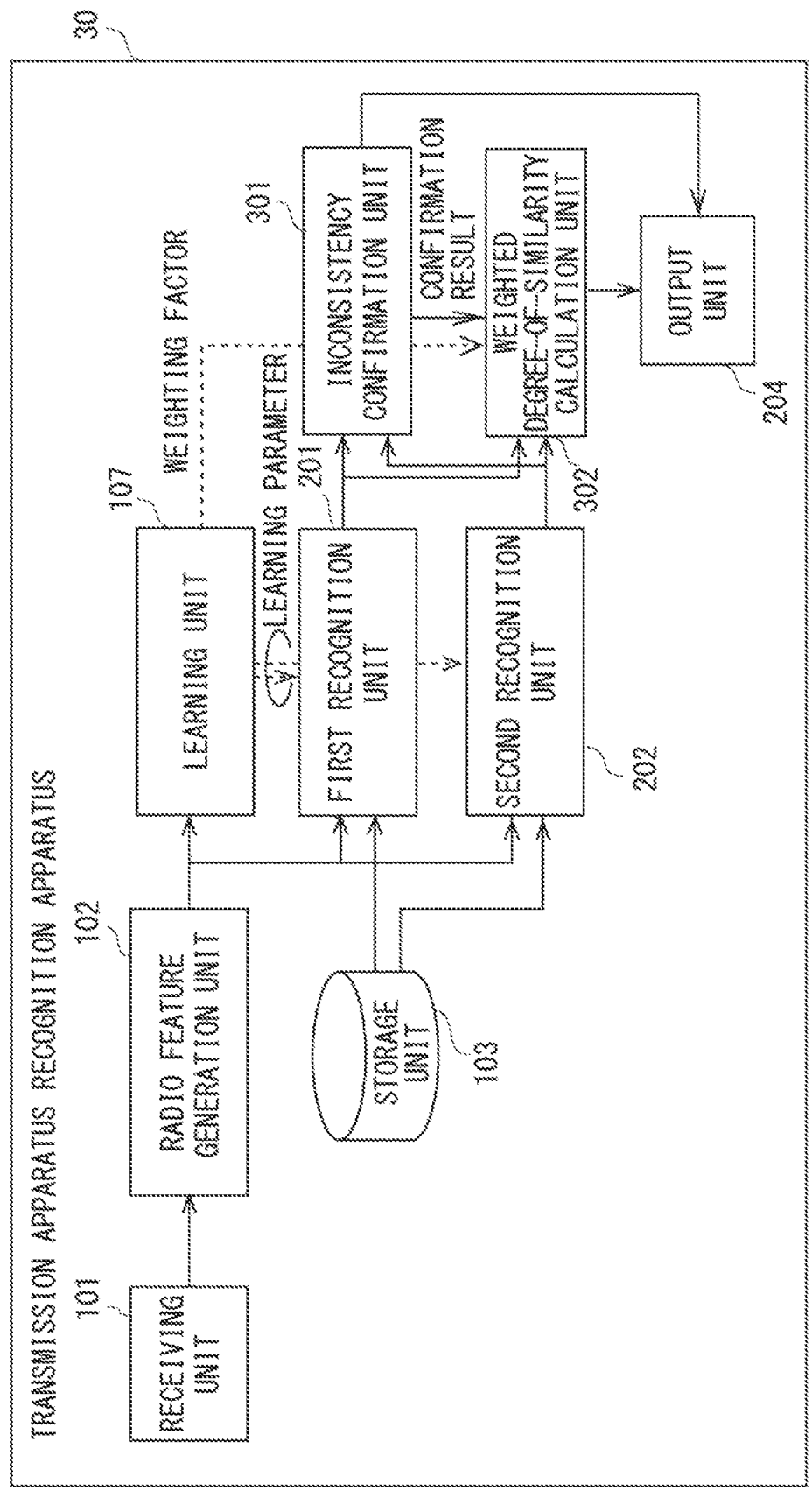
FIG. 10 is a block diagram showing an example of a functional configuration of a transmission apparatus recognition apparatus according to a third example embodiment.
Figure 11:
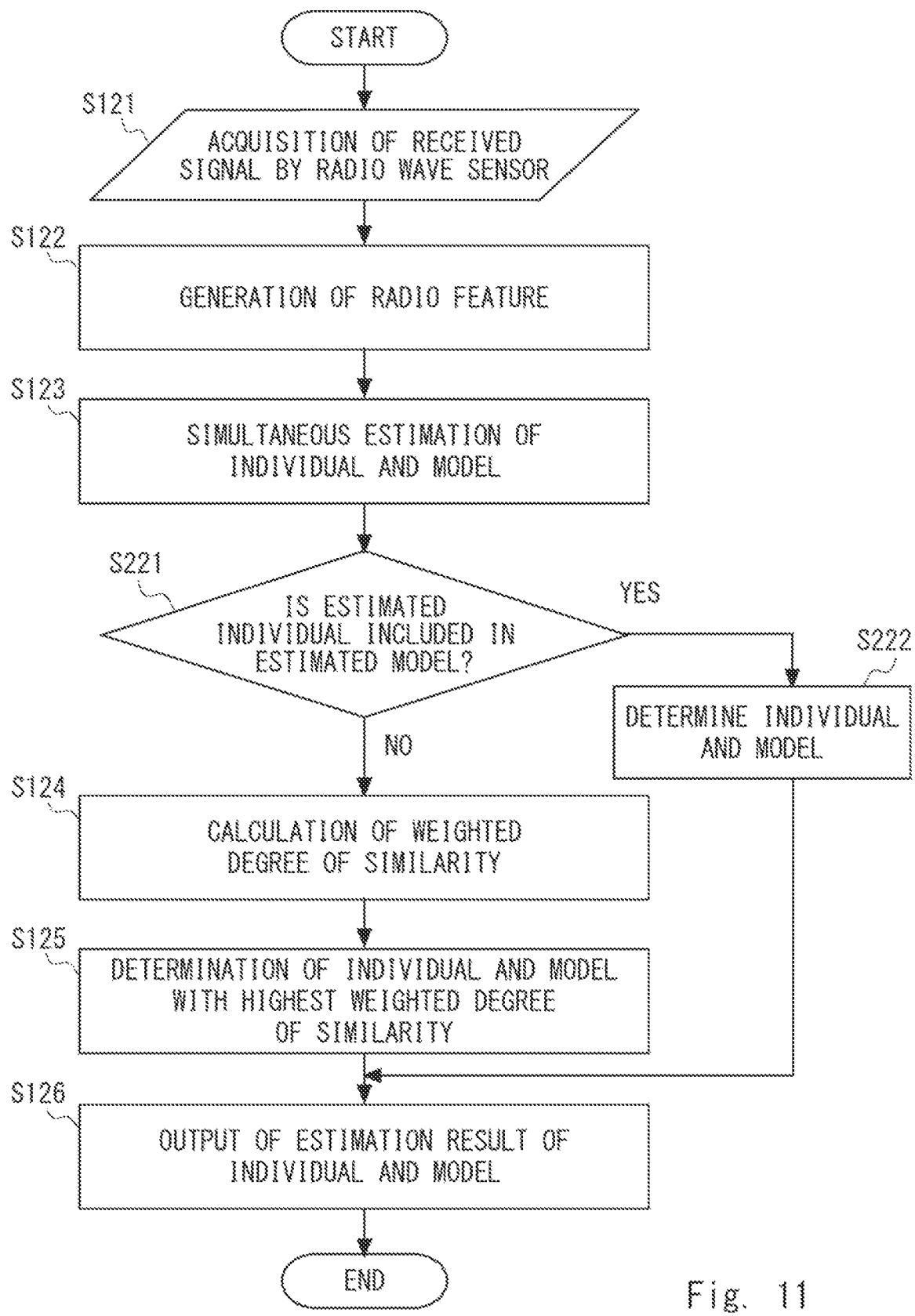
FIG. 11 is a flowchart for explaining an example of a transmission apparatus estimation process in the third example embodiment.

A third example embodiment will be described focusing on differences from the second example embodiment with reference to FIG. 10 and FIG. 11. Also in the third example embodiment, various examples described in the first and second example embodiments can be applied. The third example embodiment is a modification of the second example embodiment. FIG. 10 is a block diagram showing an example of a functional configuration of a transmission apparatus recognition apparatus according to the present example embodiment. Note that, of the components shown in FIG. 10, those having the same names as the components described in FIG. 3 of the second example embodiment have basically the same functions.

As shown in FIG. 10, the transmission apparatus recognition apparatus 30 according to the present example embodiment differs from the transmission apparatus recognition apparatus 20 of FIG. 3 in that an inconsistency confirmation unit 301 is added to the components of the transmission apparatus recognition apparatus 20, and that the transmission apparatus recognition apparatus 30 includes a weighted degree-of-similarity calculation unit 302 in which the process of the weighted degree-of-similarity calculation unit 203 is changed in accordance with this addition. Since the other components are the same, a description thereof is omitted.

The inconsistency confirmation unit 301 is an example of a determination unit to be described below. The determination unit determines whether information correlated in advance with the template feature that is a calculation source of a highest degree of similarity, among the i-th degree-of-similarity group calculated by the degree-of-similarity calculation unit 104 of FIG. 2, has consistency between 1 to K of i. It can be said that the inconsistency confirmation unit 301, in the determination unit, is an example in which the inconsistency confirmation unit 301 is adapted to an example in which K=2, and the degree-of-similarity calculation unit 104 is the first recognition unit 201 and the second recognition unit 202.

The inconsistency confirmation unit 301 inputs therein the first degree of similarity and the second degree of similarity, which are calculated by the first recognition unit 201 and second recognition unit 202, respectively, and confirms whether inconsistency occurs in the inclusive relation between the information pieces indicated by the estimation results estimated by the respective recognition units. It is assumed that the determination targets of the inconsistency are the information corresponding to the template feature that is the calculation source of the maximum value of the first degrees of similarity calculated by the first recognition unit 201, and the information corresponding to the template feature that is the calculation source of the maximum value of the second degrees of similarity calculated by the second recognition unit 202. Alternatively, other methods can be adopted, such as a method in which when the maximum value of the first degrees of similarity does not exceed the first recognition threshold value, or when the maximum value of the second degrees of similarity does not exceed the second recognition threshold value, these cases are excluded from the determination targets of the inconsistency.

When the occurrence of inconsistency is determined by the inconsistency confirmation unit 301, the weighted degree-of-similarity calculation unit 302 sums the first degree of similarity and the second degree of similarity calculated by the first recognition unit 201 and the second recognition unit 202, and outputs the summed result to the output unit 204. Then, the output unit 204 estimates that the information corresponding to the degree of similarity with the highest value is the information indicative of the transmission terminal.

On the other hand, when the inconsistency confirmation unit 301 determines that the inconsistency does not occur, the weighted degree-of-similarity calculation unit 302 is not operated, the first recognition unit 201 and second recognition unit 202 are caused to output the threshold value process results to the output unit 204. The output unit 204 receives large/small comparison results between the first degree of similarity and second degree of similarity calculated by the first recognition unit 201 and second recognition unit 202, and a first recognition threshold value and a second recognition threshold value which are preset therefor. Based on the large/small comparison results, the output unit 204 estimates that the information (the individual and the model) corresponding to the degrees of similarity having highest values among the values exceeding the first and second recognition threshold values is the information indicative of the transmission terminal, and outputs this estimation result.

Like this example, when the determination unit determines that the consistency is present, the estimation unit 106 of FIG. 2 can perform the following estimation without through the process of the summed degree-of-similarity calculation unit 105. Specifically, among the K information pieces correlated in advance with K template features that are calculation sources of the highest degree of similarity with respect to 1 to K of i, the estimation unit 106 sets, as the estimation result, the information with the highest degree of similarity exceeding a corresponding threshold value. In other words, the estimation unit 106 estimates that the information exceeding the threshold value is the information indicative of the transmission terminal that transmitted the received signal. When the consistency is absent, the transmission apparatus recognition apparatus 30 may execute the process as described in the second example embodiment.

Hereinafter, an operation example of the above-described transmission apparatus recognition apparatus 30 will be described with reference to a flow of FIG. 11. FIG. 11 is a flowchart for explaining an example of a transmission apparatus estimation process in the present example embodiment. Note that, in the third example embodiment, the overall flow and the step (step S1*l*) of calculating the learning parameter and weighting factor are the same as in the second example embodiment. In addition, FIG. 11 differs from FIG. 7 of the second example embodiment with respect to the points that step S221 is added between step S123 and step S124, and that, in accordance with this, step S222 is added as a process on the YES side of step S221.

The transmission apparatus recognition apparatus 30 receives a signal by the receiving unit 101 (step S121), and generates a radio feature from the received signal (step S122). Then, the transmission apparatus recognition apparatus 30 executes the calculation of degrees of similarity and the estimation processes of the individual and the model in the first recognition unit 201 and the second recognition unit 202, respectively (step S123).

Then, the transmission apparatus recognition apparatus 30 confirms whether the estimated individual estimated in the first recognition unit 201 is included in the estimated model estimated in the second recognition unit 202 (whether inconsistency is present or not) (step S221). If the inconsistency is present (NO in step S221), the transmission apparatus recognition apparatus 30 calculates, in the weighted degree-of-similarity calculation unit 203, a weighted degree of similarity by weighted-summing the degree of similarity on the individual side and the degree of similarity on the model side (step S124). In addition, the transmission apparatus recognition apparatus 30 determines, in the output unit 204, the individual and model having a highest weighted degree of similarity (step S125), and outputs the estimation result of the individual and model (step S126). On the other hand, when the inconsistency is absent (YES in step S221), the transmission apparatus recognition apparatus 30 executes the following process. Specifically, the transmission apparatus recognition apparatus 30 determines, in the output unit 204, the estimation result of the individual and model estimated in step S123 as an estimation result as such (step S222), and outputs the estimation result (step S126).

By the above configuration, the transmission apparatus recognition apparatus 30 according to the present example embodiment calculates at least two kinds of degrees of similarity, and corrects the single-unit degree of similarity (a certain one degree of similarity of two or more kinds of similarities) by weighted-summing the at least two kinds of degrees of similarity. Thereby, the transmission apparatus recognition apparatus 30 can obtain the same advantageous effect as in the second example embodiment. That is, in the transmission apparatus recognition apparatus 30, the decrease in identification accuracy (recognition accuracy) can be reduced, for example, even in the case where the SNR is low, or in the situation in which the results of estimation of the above two or more kinds of information do not agree since the surrounding environment of the receiver is greatly different from the surrounding environment at the time of learning.

Fourth Example Embodiment

Figure 12:
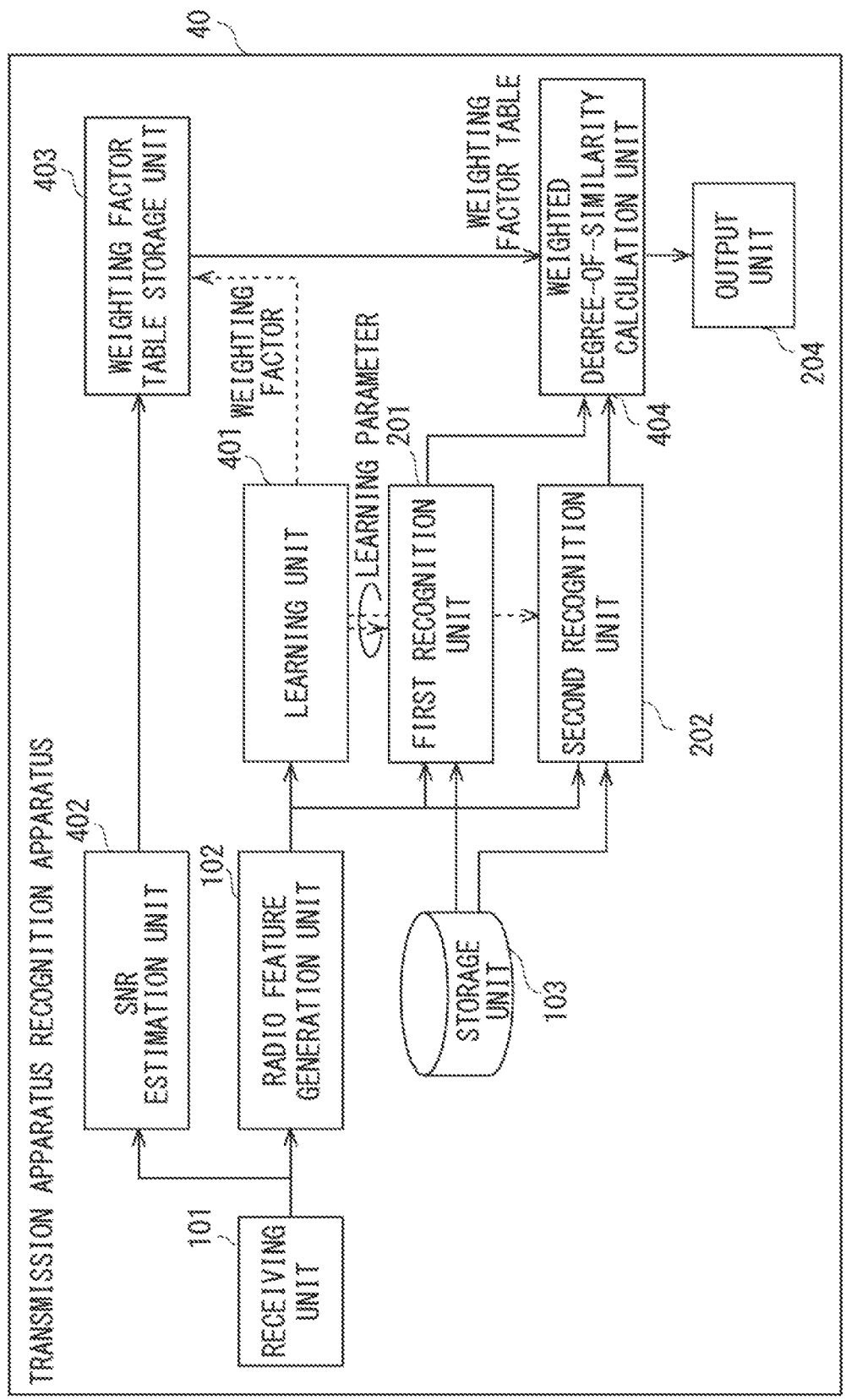
FIG. 12 is a block diagram showing an example of a functional configuration of a transmission apparatus recognition apparatus according to a fourth example embodiment.
Figure 13:
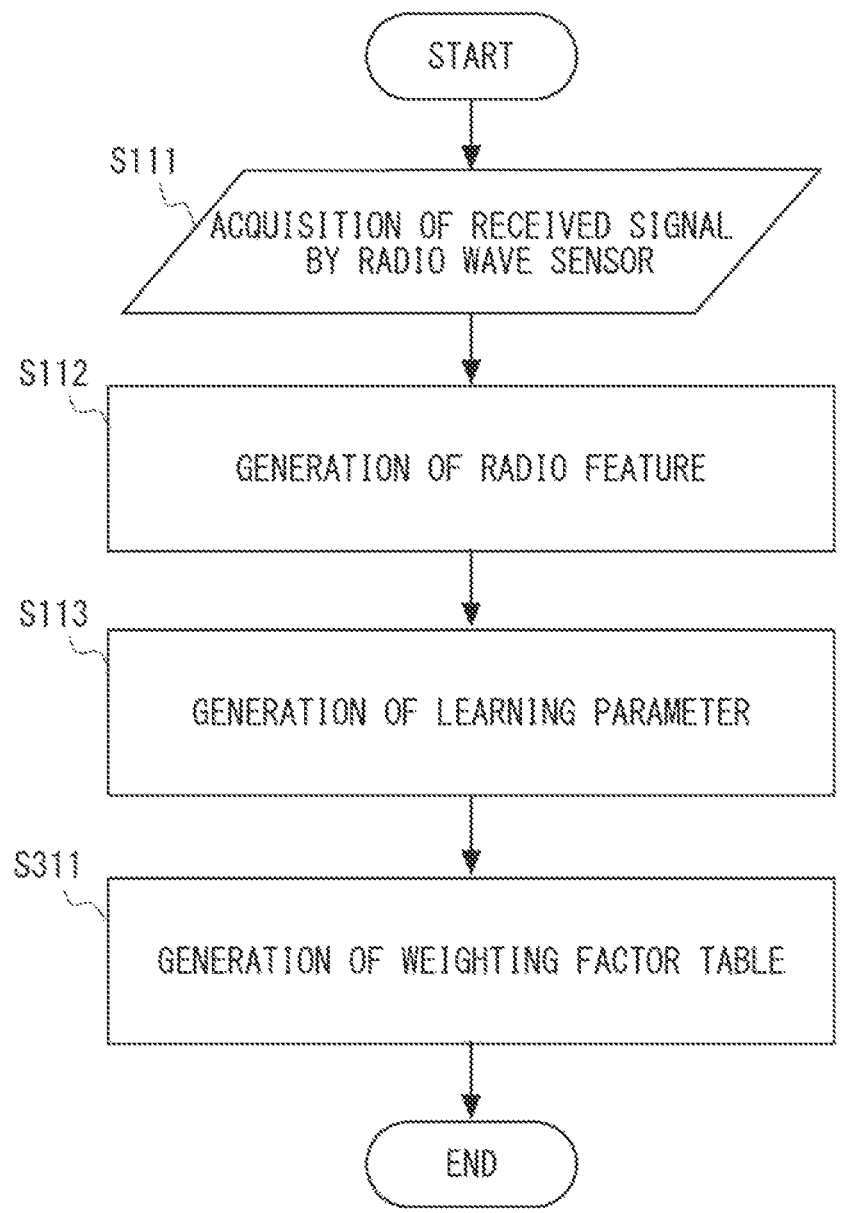
FIG. 13 is a flowchart for explaining a process example relating to learning parameter generation and weighting factor calculation in the fourth example embodiment.
Figure 14:
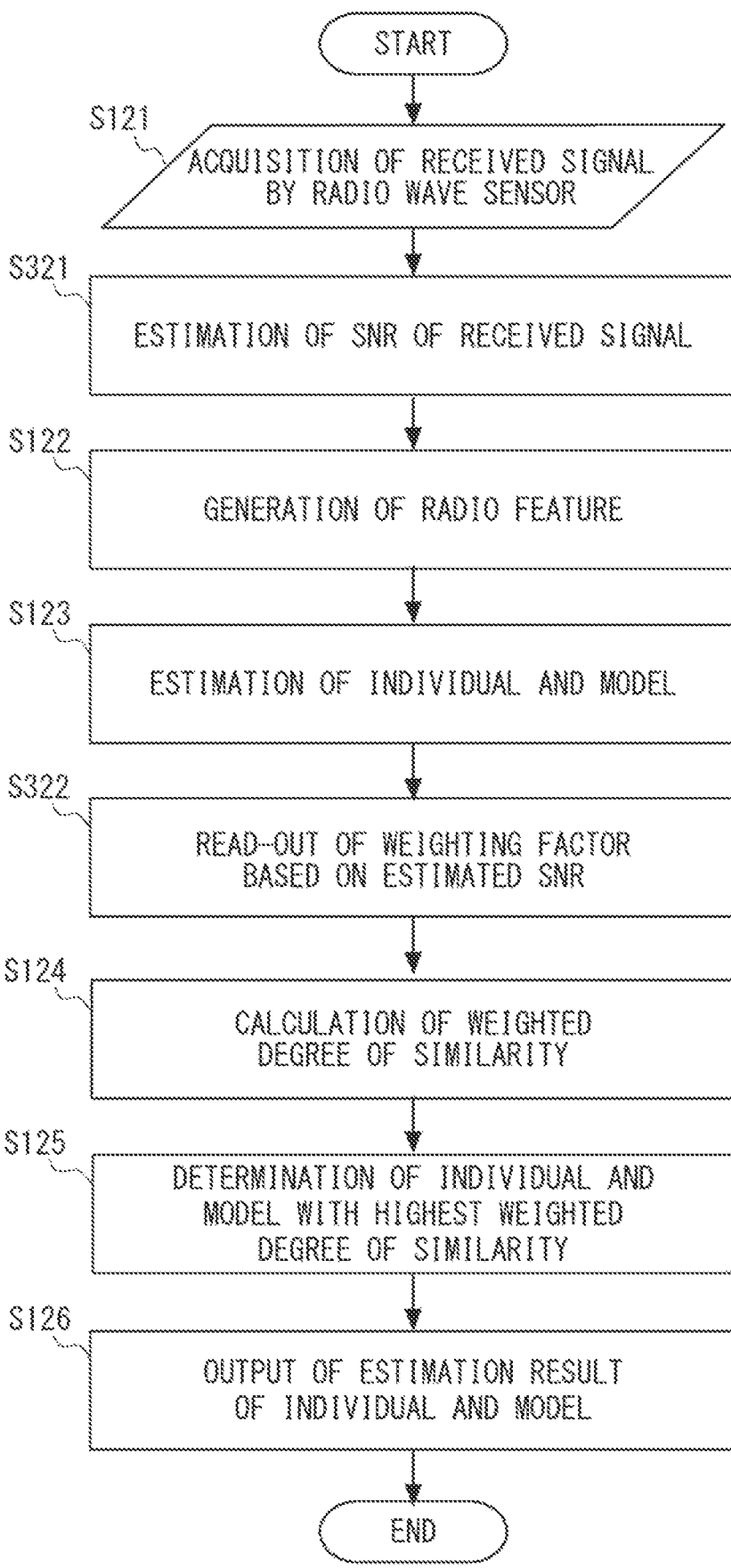
FIG. 14 is a flowchart for explaining an example of a transmission apparatus estimation process in the fourth example embodiment.

A fourth example embodiment will be described focusing on differences from the second example embodiment with reference to FIG. 12 to FIG. 14. Also in the fourth example embodiment, various examples described in the first to third example embodiments can be applied. In the fourth example embodiment, compared to the second example embodiment, a block that estimates a signal-to-noise ratio (SNR) of the received signal is added, and a process of changing the weighting factor of the weighted degree of similarity in accordance with the reception SNR is added. FIG. 12 is a block diagram showing an example of a functional configuration of a transmission apparatus recognition apparatus according to the present example embodiment. Note that, of the components shown in FIG. 12, those having the same names as the components described in FIG. 3 of the second example embodiment have basically the same functions.

As shown in FIG. 12, the transmission apparatus recognition apparatus 40 according to the present example embodiment differs from the transmission apparatus recognition apparatus 20 of FIG. 3 with respect to the points that an SNR estimation unit 402 and a weighting factor table storage unit 403 are added to the components of the transmission apparatus recognition apparatus 20, and that the configuration is changed in accordance with this addition. The points in the configuration changed due to the addition are that a learning unit 401, in which the process of the learning unit 107 is changed, is included, and a weighted degree-of-similarity calculation unit 404, in which the process of the weighted degree-of-similarity calculation unit 203 is changed, is included. Since the other components are the same, a description thereof is omitted.

The learning unit 401 inputs therein, for example, the radio feature generated by the radio feature generation unit 102 and a label (training information of the individual or the model), and generates a learning parameter by learning by various supervised learning algorithms of machine learning, deep learning or the like. In addition, the learning unit 401 executes performance evaluation of a learning model to which Additive White Gaussian Noise (AWGN) of different SNRs is added at the time of learning. Furthermore, the learning unit 401 calculates, for each reception SNR, a probability of an error between different models among error rates of individual estimation at the time of learning, or an error rate of model estimation, and generates a weighting factor table for use in the calculation of the weighted degree of similarity, based on the calculated probability or the error rate. Note that in this weighting factor table, for example, a correspondence relation between weighting factors $\lambda_i$ and $\lambda_t$ may be finely generated in units of 1 dB, or may be roughly generated in units of, for example, 5 dB.

The SNR estimation unit 402 and the weighting factor table storage unit 403 are examples of a noise estimation unit and a factor storage unit to be described below. The noise estimation unit estimates a signal-to-noise ratio (SNR) of the received signal that is received by the receiving unit 101. The factor storage unit stores K weighting factors for respective levels of the SNR. It can be said that the SNR estimation unit 402 and the weighting factor table storage unit 403 are examples in which the SNR estimation unit 402 and the weighting factor table storage unit 403 are adapted to an example in which K=2 in the noise estimation unit and the factor storage unit.

The SNR estimation unit 402 estimates a value (dB) of the SNR of the received signal received by the receiving unit 101. The weighting factor storage unit 403 executes a process of saving the weighting factor table generated by the learning unit 401, and a process of reading out the weighting factors, based on the estimated SNR of the received signal. The latter process is a process of outputting to the weighted degree-of-similarity calculation unit 404 the corresponding weighting factors $\lambda_i$ and $\lambda_t$, based on the SNR value (dB) estimated by the SNR estimation unit 402.

The weighted degree-of-similarity calculation unit 404 executes the weighted-summing process by using K weighting factors correlated with levels indicated by the SNR estimated by the noise estimation unit. In this example, the weighted degree-of-similarity calculation unit 404 executes the weighted-summing process by using two weighting factors correlated with levels indicated by the SNR estimated by the SNR estimation unit 402. Specifically, the weighted degree-of-similarity calculation unit 404 weighted-sums the first degree of similarity and the second degree of similarity, which are calculated by the first recognition unit 201 and second recognition unit 202, based on the weighting factors $\lambda_i$ and $\lambda_t$ corresponding to the estimated SNR value. The output unit 204 receives the result of the weighted-summing process, estimates that the information corresponding to the degree of similarity having the highest value is the information indicative of the transmission terminal, and outputs this estimation result.

Hereinafter, an operation example of the above-described transmission apparatus recognition apparatus 40 will be described with reference to flows of FIG. 13 and FIG. 14. FIG. 13 is a flowchart for explaining an example of a process relating to the learning parameter generation and the weighting factor calculation (a process corresponding to step S11 of FIG. 5) in the present example embodiment. FIG. 14 is a flowchart for explaining an example of a transmission apparatus estimation process (a process corresponding to step S12 of FIG. 5) in the present example embodiment. Note that in the fourth example embodiment, the overall flow is the same as in the second example embodiment. In addition, FIG. 13 differs from FIG. 6 of the second example embodiment with respect to the point that step S114 is replaced with step S311. Furthermore, FIG. 14 differs from FIG. 7 of the second example embodiment with respect to the points that step S321 is added between step S121 and step S122, and that step S322 is added between step S123 and step S124.

As an example of step S11 of FIG. 5, the transmission apparatus recognition apparatus 40 receives a signal by the receiving unit 101 (step S111), and generates a radio feature from the received signal (step S112). Then, by inputting the radio feature together with a label, the transmission apparatus recognition apparatus 40 generates learning parameters by various algorithms of machine learning, deep learning or the like (step S113). At the time of learning of step S113, the transmission apparatus recognition apparatus 40 executes performance evaluation of a learning model to which AWGN of different SNRs is added, and calculates, for each reception SNR, a probability of an error between different models among error rates of individual estimation at the time of learning, or an error rate of model estimation. In addition, the transmission apparatus recognition apparatus 40 generates a weighting factor table for use in the calculation of the weighted degree of similarity, based on the calculated probability or the error rate (step S311). The generated weighting factor table is stored in the weighting factor table storage unit 403.

As an example of step S12 of FIG. 5, the transmission apparatus recognition apparatus 40 receives a signal by the receiving unit 101 (step S121), estimates the SNR of the received signal (step S321), and generates a radio feature from the received signal (step S122). Then, the transmission apparatus recognition apparatus 40 executes the calculation of degrees of similarity and the estimation processes of the individual and the model in the first recognition unit 201 and the second recognition unit 202, respectively (step S123). Subsequently, the transmission apparatus recognition apparatus 40 reads out, in the weighted degree-of-similarity calculation unit 404, the weighting factor corresponding to the estimated SNR estimated in step S321, from the weighting factor table storage unit 403 (step S322). Then, the transmission apparatus recognition apparatus 40 calculates, in the weighted degree-of-similarity calculation unit 404, a weighted degree of similarity by weighted-summing the degree of similarity on the individual side and the degree of similarity on the model side (step S124). In addition, the transmission apparatus recognition apparatus 40 determines, in the output unit 204, the individual and model having a highest weighted degree of similarity (step S125), and outputs the estimation result of the individual and model (step S126).

By the above configuration, the transmission apparatus recognition apparatus 40 according to the present example embodiment calculates at least two kinds of degrees of similarity, and corrects the single-unit degree of similarity (a certain one degree of similarity of two or more kinds of similarities) by weighted-summing the at least two kinds of degrees of similarity. Thereby, the transmission apparatus recognition apparatus 40 can obtain the same advantageous effect as in the second example embodiment. That is, in the transmission apparatus recognition apparatus 40, the decrease in identification accuracy (recognition accuracy) can be reduced, for example, even in the case where the SNR is low, or in the situation in which the results of estimation of the above two or more kinds of information do not agree since the surrounding environment of the receiver is greatly different from the surrounding environment at the time of learning. Furthermore, in the present example embodiment, it is possible to reduce the influence in the case where the weighting factor of the weighted degree-of-similarity calculation is inappropriately set due to the variation of the single-unit recognition error rate (in the above example, the single-unit recognition error rate in the first and second recognition) according to the reception SNR. Thereby, in the present embodiment, the effect of reducing the decrease in identification accuracy (recognition accuracy) can be increased.

Fifth Example Embodiment

Figure 15:
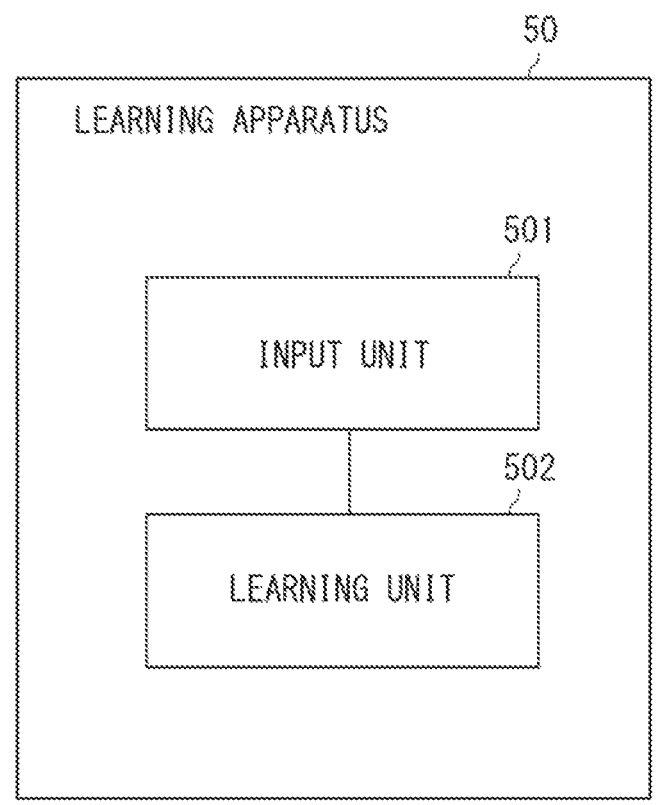
FIG. 15 is a block diagram showing an example of a functional configuration of a learning apparatus according to a fifth example embodiment.

A fifth example embodiment will be described with reference to FIG. 15. Various applied examples relating to the learning unit described in the second to fourth example embodiments are applicable. FIG. 15 is a block diagram showing an example of a functional configuration of a learning apparatus according to the fifth example embodiment.

As shown in FIG. 15, the learning apparatus 50 according to the present example embodiment includes an input unit 501 which inputs therein the radio feature generated by the transmission apparatus recognition apparatus 1, 10, 20, 30,

40, and a learning unit 502. The input unit 501 can input therein the radio feature from an apparatus that does not include the learning unit 107, 401 in the transmission apparatus recognition apparatus 10, 20, 30, 40, and can also input therein the radio feature from some other apparatus (an apparatus which includes, however, the receiving unit 101 and the radio feature generation unit 102). In addition, with the receiving unit 101 and the radio feature generation unit 102 being included in the learning apparatus 50, the input unit 501 can input therein the radio feature from the radio feature generation unit 102. Alternatively, with the radio feature generation unit 102 being included in the learning apparatus 50, the learning apparatus 50 can also receive the received signal from the apparatus including the receiving unit 101, and can input, by the input unit 501, the radio feature generated by the radio feature generation unit 102.

The learning unit 502 is a unit corresponding to the learning unit 107 of FIG. 2 and FIG. 3, and generates a learning model which inputs therein the radio feature that is input by the input unit 501, and outputs the parameter for generating the i-th sample feature and the i-th weighting factor. The learning algorithms or the like are as described in connection with the learning unit 107, 401.

By the above configuration, in the learning apparatus according to the present example embodiment, the learning unit as described in the second to fourth example embodiments can be caused to function independently, and the learning unit may not be provided in the transmission apparatus recognition apparatuses described in the second to fourth example embodiments. Thus, in the present example embodiment, for example, the result (the learning parameter and weighting factor, or the like) learned by the learning model, i.e. the learning apparatus, can be applied to a plurality of transmission apparatus recognition apparatuses, and the learning itself can be executed based on the radio waves in the plurality of transmission apparatus recognition apparatuses.

However, there is also a case where it is preferable to perform learning according to the arrangement (places of installation) of transmission apparatus recognition apparatuses. In this case, it is preferable to perform learning individually, or to add a process according to the place of installation (for example, to learn by adding the learning parameter to the parameter of the place of installation).

Other Example Embodiments

The above-described example embodiments can be combined as long as there is no conflict with each other.

In addition, in the flowcharts referred to in the description of the second to fourth example embodiments, a plurality of steps (processes) are described in order, but the execution order of the steps executed in each example embodiment is not limited to the order of description. In each example embodiment, the order of the illustrated steps can be changed within a range that does not hinder anything in the processes, for example, each process can be executed in parallel.

In addition, as in the description in the first to fourth example embodiments on the procedure of processing in the transmission apparatus recognition apparatus, the present disclosure may also take a form as a transmission apparatus recognition method in a transmission apparatus recognition apparatus. This transmission apparatus recognition apparatus includes a receiving unit which receives a signal wirelessly transmitted from a transmission terminal, and a storage unit which stores K sets of template feature groups. In addition, this transmission apparatus recognition method can include the following radio feature generation step, degree-of-similarity calculation step, summed degree-of-similarity calculation step, and estimation step. The radio feature generation step generates a radio feature from a received signal received by the receiving unit. The degree-of-similarity calculation step generates an i-th sample feature from the radio feature, and an i-th degree-of-similarity group. The summed degree-of-similarity calculation step calculates a summed degree of similarity by executing a process including a weighted-summing process. The weighted-summing process selects, one by one, the degrees of similarity included in the i-th degree-of-similarity group, with respect to 1 to K of i, and weighted-sums the degrees of similarity included in the i-th degree-of-similarity group by an i-th weighting factor with respect to K selected degrees of similarity in total. The estimation step estimates, with respect to K template features that are calculation sources of K degrees of similarity having the summed degree of similarity that is highest, that K information pieces correlated in advance with the K template features are information indicative of the transmission apparatus that transmitted the received signal. Note that other examples are as described in the above various example embodiments.

In addition, as in the description in the second to fifth example embodiments on the procedure of processing in the learning unit and the learning apparatus, the present disclosure may also take a form as a learning method in the transmission apparatus recognition apparatus or a learning method in the learning apparatus. The input step inputs therein a radio feature generated from a received signal, the received signal being a signal wirelessly transmitted from a transmission apparatus and received. The learning step generates a learning model which inputs therein the radio feature that is input by the input step, and outputs a parameter for generating an i-th sample feature, and an i-th weighting factor. Note that other examples are as described in the above various example embodiments.

Furthermore, regarding the transmission apparatus recognition apparatus and its system according to the first to fourth example embodiments, the individual units that are the components thereof have been functionally described, but the present disclosure is not limited to this. For example, the recognition unit may include a radio feature generation unit, as long as the transmission apparatus recognition apparatus includes the function of each unit. In addition, in each of the above-described example embodiments, the description has been made on the assumption that the transmission apparatus recognition apparatus is configured as a single apparatus, but it can be configured as a plurality of apparatuses by dividing the functions. Besides, regarding the learning apparatus according to the fifth example embodiment, the individual units that are the components thereof have been functionally described, but the present disclosure is not limited to this. In addition, in the fifth example embodiment, the description has been made on the assumption that the learning apparatus is configured as a single apparatus, but it can be configured as a plurality of apparatuses by dividing the functions.

Figure 16:
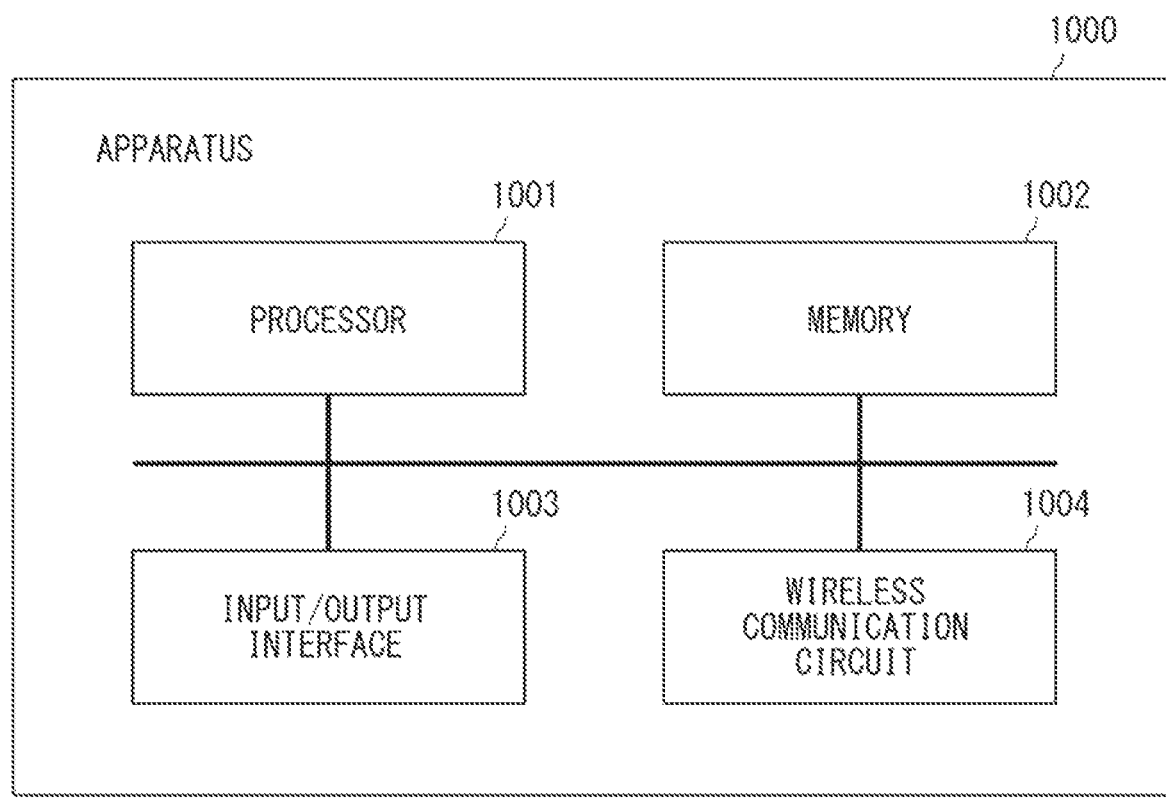
FIG. 16 is a diagram showing an example of a hardware configuration included in an apparatus.

In addition, the transmission apparatus recognition apparatus according to the first to fourth example embodiments and the learning apparatus according to the fifth example embodiment can each have the following hardware configuration. FIG. 16 is a diagram showing an example of a hardware configuration included in the apparatus.

An apparatus 1000 illustrated in FIG. 16 can be the transmission apparatus recognition apparatus according to the first to fourth example embodiments or the learning apparatus according to the fifth example embodiment. The apparatus 1000 functioning as the transmission apparatus recognition apparatus or the learning apparatus can be composed of an information processing apparatus (a so-called computer), and includes, for example, a processor 1001, a memory 1002, an input/output interface 1003, a wireless communication circuit 1004. Note that the apparatus 1000 may include a wired communication circuit in addition to the wireless communication circuit 1004. The components such as the processor 1001 are connected by an internal bus or the like, and are configured to be mutually communicable.

The processor 1001 is a programmable apparatus such as a CPU (Central Processing Unit), an MPU (Micro Processing Unit), a DSP (Digital Signal Processor), or a GPU. Alternatively, the processor 1001 may be an apparatus such as an FPGA (Field Programmable Gate Array) or an ASIC (Application Specific Integrated Circuit). The processor 1001 can execute various programs including an operating system (OS).

The memory 1002 is a storage apparatus such as a RAM (Random Access Memory), a ROM (Read Only Memory), an HDD (Hard Disk Drive), an SSD (Solid State Drive), or a memory card. The memory 1002 stores an OS program, an application program, and various data.

The input/output interface 1003 is an interface of a display apparatus or an input apparatus (not shown). The display apparatus is, for example, a liquid crystal display. The input apparatus is, for example, an apparatus that accepts user operations such as a keyboard and a mouse.

The wireless communication circuit 1004 is a circuit, a module, or the like that performs wireless communication with other apparatuses. For example, the wireless communication circuit 1004 includes an RF (Radio Frequency) circuit. Note that a part or all of the apparatus 1000 can also be realized by one or more integrated circuits.

The function of the apparatus 1000 as the transmission apparatus recognition apparatus can be realized by various processing modules. The processing module is realized, for example, by the processor 1001 executing a program stored in the memory 1002. Note that the above-described processing module may be realized by a semiconductor chip.

The program (transmission apparatus recognition program) in the case where the apparatus 1000 is the transmission apparatus recognition apparatus can be a program for causing a computer to execute the above-mentioned radio feature generation step, degree-of-similarity calculation step, summed degree-of-similarity calculation step, and estimation step. This computer includes a receiving unit (illustrated in the wireless communication circuit 1004) that receives a signal wirelessly transmitted from a transmission terminal, and a storage unit that stores K sets of template feature groups. Note that other examples are as described in the various example embodiments described above.

The function of the apparatus 1000 as the learning apparatus can be realized by various processing modules. The processing modules can be realized by the processor 1001 executing a program stored in the memory 1002. Since it suffices that the apparatus 1000 in this case is configured such that learning data is input, the apparatus 1000, for example, may not include the wireless communication circuit 1004. Note that, in this case, too, the processing module may be realized by a semiconductor chip.

The program (learning program) in the case where the apparatus 1000 is the learning apparatus can be a program for causing a computer to execute the above-described input step and learning step. Note that other examples are as described in the above various example embodiments.

In addition, the transmission apparatus recognition program and learning program described above can be stored in a computer readable storage medium. This storage medium can be non-transitory, that is, a non-transitory computer readable medium. As described above, the object of the present disclosure can also be realized by embodying it as a computer program product. For example, the program can be downloaded via a network or updated using a storage medium that stores the program. Furthermore, the processing module described above may be realized by a semiconductor chip.

As described above, each program includes instructions (or software codes) that, when loaded into a computer, cause the computer to perform one or more of the functions described in the example embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Note that the present disclosure is not limited to the above example embodiment, and can be appropriately modified without departing from the spirit. In addition, the present disclosure may be carried out by appropriately combining the respective example embodiments. The first to fourth example embodiments can be combined as desirable by one of ordinary skill in the art.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

The whole or part of the example embodiments disclosed above can be described as, but not limited to, the following supplementary notes.

<Supplementary Note>
(Supplementary Note 1)

A transmission apparatus recognition apparatus comprising:
 a receiving unit configured to receive a signal wirelessly transmitted from a transmission apparatus;
 a radio feature generation unit configured to generate a radio feature from a received signal received by the receiving unit;
 a storage unit configured to store K sets of template feature groups for estimating K kinds of information indicative of the transmission apparatus, K being an integer of 2 or more;
 a degree-of-similarity calculation unit configured to generate an i-th sample feature from the radio feature, i being an integer of 1 to K, and configured to calculate an i-th degree-of-similarity group that is degrees of similarity between the i-th sample feature and template features included in an i-th set of the template feature group;

a summed degree-of-similarity calculation unit configured to calculate a summed degree of similarity, by executing a process including a weighted-summing process of selecting, one by one, the degrees of similarity included in the i-th degree-of-similarity group, with respect to 1 to K of i, and weighted-summing the degrees of similarity included in the i-th degree-of-similarity group by an i-th weighting factor with respect to K selected degrees of similarity in total; and an estimation unit configured to estimate, with respect to K template features that are calculation sources of K degrees of similarity having the summed degree of similarity that is highest, that K information pieces correlated in advance with the K template features are information indicative of the transmission apparatus that transmitted the received signal, wherein the K sets include a set of a template feature group indicative of a predetermined kind, and a set of a template feature group indicative of one or more other kinds, information of which can be determined by information of the predetermined kind.

(Supplementary Note 2)

The transmission apparatus recognition apparatus according to Supplementary note 1, wherein, among K weighting factors, weighting factors corresponding to the predetermined kind and the one or more other kinds are values normalized such that, with respect to each of the predetermined kind and the one or more other kinds, an accuracy, which is a value acquired by subtracting, from 1, an error rate that is a rate of an error of an estimation result, is calculated, and a ratio to a sum of the accuracies becomes 1 in total.

(Supplementary Note 3)

The transmission apparatus recognition apparatus according to Supplementary note 1 or 2, further comprising a determination unit configured to determine whether information correlated in advance with the template feature that is a calculation source of a highest degree of similarity, among the i-th degree-of-similarity group calculated by the degree-of-similarity calculation unit, has consistency between 1 to K of i.

(Supplementary Note 4)

The transmission apparatus recognition apparatus according to Supplementary note 3, wherein when the determination unit determines that the consistency is present, the estimation unit estimates that, among the K information pieces correlated in advance with K template features that are calculation sources of the highest degree of similarity with respect to 1 to K of i, information with the highest degree of similarity exceeding a corresponding threshold value is the information indicative of the transmission apparatus that transmitted the received signal.

(Supplementary Note 5)

The transmission apparatus recognition apparatus according to any one of Supplementary notes 1 to 4, wherein with respect to the K template features that are the calculation sources of the K degrees of similarity having the summed degree of similarity that is highest, the estimation unit estimates that, among the K information pieces correlated in advance with the K template features, information corresponding to a degree of similarity exceeding a corresponding threshold value, among K degrees of similarity having the summed degree of similarity that is highest, is the information indicative of the transmission apparatus that transmitted the received signal.

(Supplementary Note 6)

The transmission apparatus recognition apparatus according to Supplementary note 1 or 2, wherein the estimation unit includes a determination unit configured to determine, as a result of the estimation that, with respect to K template features that are calculation sources of K degrees of similarity having the summed degree of similarity that is highest, K information pieces correlated in advance with the K template features are information indicative of the transmission apparatus that transmitted the received signal, whether consistency is present between the K information pieces, and when the determination unit determines that the consistency is not present, the estimation unit estimates that information having no consistency with the information correlated in advance with the template feature, which is a calculation source of a highest degree of similarity among the K degrees of similarity with the summed degree of similarity that is highest, is not the information indicative of the transmission apparatus that transmitted the received signal.

(Supplementary Note 7)

The transmission apparatus recognition apparatus according to any one of Supplementary notes 1 to 6, wherein the K sets of template feature groups include at least one of a feature group indicative of an individual of the transmission apparatus, a feature group indicative of a model of the transmission apparatus, and a feature group indicative of an attribute of the transmission apparatus.

(Supplementary Note 8)

The transmission apparatus recognition apparatus according to any one of Supplementary notes 1 to 7, further comprising:

a noise estimation unit configured to estimate a signal-to-noise ratio of the received signal received by the receiving unit; and a factor storage unit configured to store K weighting factors for respective levels of the signal-to-noise ratio, wherein the summed degree-of-similarity calculation unit executes the weighted-summing process by using K weighting factors correlated with levels indicated by the signal-to-noise ratio estimated by the noise estimation unit.

(Supplementary Note 9)

The transmission apparatus recognition apparatus according to any one of Supplementary notes 1 to 8, wherein the degree-of-similarity calculation unit calculates the i-th sample feature from the radio feature by parallel processing with respect to 1 to K of i.

(Supplementary Note 10)

The transmission apparatus recognition apparatus according to any one of Supplementary notes 1 to 8, wherein the degree-of-similarity calculation unit calculates the i-th sample feature from the radio feature sequentially with respect to 1 to K of i.

(Supplementary Note 11)

The transmission apparatus recognition apparatus according to any one of Supplementary notes 1 to 10, further comprising a learning unit configured to generate a learning model which inputs therein the radio feature and outputs a parameter for generating the i-th sample feature and the i-th weighting factor, wherein the degree-of-similarity calculation unit calculates the i-th sample feature from the radio feature by using the parameter, and the summed degree-of-similarity calculation unit calculates the summed degree of similarity by using the weighting factor.

(Supplementary Note 12)

A learning apparatus comprising:

an input unit configured to input therein the radio feature generated by the transmission apparatus recognition apparatus according to any one of Supplementary notes 1 to 10; and a learning unit configured to generate a learning model which inputs therein the radio feature that is input by the input unit, and outputs a parameter for generating the i-th sample feature and the i-th weighting factor.

(Supplementary Note 13)

A learning apparatus comprising:

an input unit configured to input therein a radio feature generated from a received signal, the received signal being a signal wirelessly transmitted from a transmission apparatus and received; and a learning unit configured to generate a learning model which inputs therein the radio feature that is input by the input unit, and outputs a parameter for generating an i-th sample feature for calculating degrees of similarity to an i-th set of a template feature group, and an i-th weighting factor, with K being an integer of 2 or more and i being an integer of 1 to K, wherein K sets of template feature groups include a template feature group indicative of a predetermined kind, and a template feature group indicative of one or more other kinds, information of which can be determined by information of the predetermined kind, and the i-th weighting factor is a factor by which an i-th degree of similarity is weighted when a weighted-summing process is executed for the i-th degree of similarity with respect to 2 to K of i, the i-th degree of similarity being a degree of similarity for the i-th sample feature.

(Supplementary Note 14)

A transmission apparatus recognition method comprising:

a radio feature generation step of generating a radio feature from a received signal received by a receiving unit, by a transmission apparatus recognition apparatus including the receiving unit configured to receive a signal wirelessly transmitted from a transmission apparatus, and a storage unit configured to store K sets of template feature groups for estimating K kinds of information indicative of the transmission apparatus, K being an integer of 2 or more;

a degree-of-similarity calculation step of generating, by the transmission apparatus recognition apparatus, an i-th sample feature from the radio feature, i being an integer of 1 to K, and calculating an i-th degree-of-similarity group that is degrees of similarity between the i-th sample feature and template features included in an i-th set of the template feature group;

a summed degree-of-similarity calculation step of calculating, by the transmission apparatus recognition apparatus, a summed degree of similarity by executing a process including a weighted-summing process of selecting, one by one, the degrees of similarity included in the i-th degree-of-similarity group, with respect to 1 to K of i, and weighted-summing the degrees of similarity included in the i-th degree-of-similarity group by an i-th weighting factor with respect to K selected degrees of similarity in total; and an estimation step of estimating, by the transmission apparatus recognition apparatus, with respect to K template features that are calculation sources of K degrees of similarity having the summed degree of similarity that is highest, that K information pieces correlated in advance with the K template features are information indicative of the transmission apparatus that transmitted the received signal, wherein the K sets include a set of a template feature group indicative of a predetermined kind, and a set of a template feature group indicative of one or more other kinds, information of which can be determined by information of the predetermined kind.

(Supplementary Note 15)

A learning method comprising:

an input step of inputting a radio feature generated from a received signal, the received signal being a signal wirelessly transmitted from a transmission apparatus and received; and a learning step of generating a learning model which inputs therein the radio feature that is input by the inputting, and outputs a parameter for generating an i-th sample feature for calculating degrees of similarity to an i-th set of a template feature group, and an i-th weighting factor, with K being an integer of 2 or more and i being an integer of 1 to K, wherein K sets of template feature groups include a template feature group indicative of a predetermined kind, and a template feature group indicative of one or more other kinds, information of which can be determined by information of the predetermined kind, and the i-th weighting factor is a factor by which an i-th degree of similarity is weighted when a weighted-summing process is executed for the i-th degree of similarity with respect to 2 to K of i, the i-th degree of similarity being a degree of similarity for the i-th sample feature.

(Supplementary Note 16)

A program for causing a computer including a receiving unit configured to receive a signal wirelessly transmitted from a transmission apparatus, and a storage unit configured to store K sets of template feature groups for estimating K kinds of information indicative of the transmission apparatus, K being an integer of 2 or more, the K sets including a set of a template feature group indicative of a predetermined kind, and a set of a template feature group indicative of one or more other kinds, information of which can be determined by information of the predetermined kind, to execute:

a radio feature generation step of generating a radio feature from a received signal received by the receiving unit;

a degree-of-similarity calculation step of generating an i-th sample feature from the radio feature, i being an integer of 1 to K, and calculating an i-th degree-of-similarity group that is degrees of similarity between the i-th sample feature and template features included in an i-th set of the template feature group;

a summed degree-of-similarity calculation step of calculating a summed degree of similarity by executing a process including a weighted-summing process of selecting, one by one, the degrees of similarity included in the i-th degree-of-similarity group, with respect to 1 to K of i, and weighted-summing the degrees of similarity included in the i-th degree-of-similarity group by an i-th weighting factor with respect to K selected degrees of similarity in total; and an estimation step of estimating, with respect to K template features that are calculation sources of K degrees of similarity having the summed degree of similarity that is highest, that K information pieces correlated in advance with the K template features are information indicative of the transmission apparatus that transmitted the received signal.

(Supplementary Note 17)

A program for causing a computer, with K being an integer of 2 or more and i being an integer of 1 to K, and K sets of template feature groups including a template feature group indicative of a predetermined kind, and a template feature group indicative of one or more other kinds, information of which can be determined by information of the predetermined kind, to execute:

an input step of inputting a radio feature generated from a received signal, the received signal being a signal wirelessly transmitted from a transmission apparatus and received; and a learning step of generating a learning model which inputs therein the radio feature that is input by the input step, and outputs a parameter for generating an i-th sample feature for calculating degrees of similarity to an i-th set of a template feature group, and an i-th weighting factor, the i-th weighting factor being a factor by which an i-th degree of similarity is weighted when a weighted-summing process is executed for the i-th degree of similarity with respect to 2 to K of i, the i-th degree of similarity being a degree of similarity for the i-th sample feature.

According to the present disclosure, there can be provided a transmission apparatus recognition apparatus, a transmission apparatus recognition method, and a program, capable of reducing a situation in which estimation results become inconsistent when a plurality of kinds of information indicative of a transmission apparatus that is a recognition target are estimated from a signal wirelessly transmitted from the transmission apparatus. In addition, according to the present disclosure, there can be provided a learning apparatus, a learning method, and a program, which generate a learning model used in the transmission apparatus recognition apparatus. Note that, according to the present disclosure, other effects may be exhibited in place of or in combination with such effects.

What is claimed is:

1. A transmission apparatus recognition apparatus comprising:

a receiver configured to receive a signal wirelessly transmitted from a transmission apparatus;

a processor; and a memory storing instructions executable by the processor to:

generate a radio feature from a received signal received by the receiver;

store K sets of template feature groups for estimating K kinds of information indicative of the transmission apparatus, K being an integer of 2 or more;

generate an i-th sample feature from the radio feature, i being an integer of 1 to K, and calculate an i-th degree-of-similarity group that is degrees of similarity between the i-th sample feature and template features included in an i-th set of the template feature group;

calculate a summed degree of similarity, by executing a process including a weighted-summing process of selecting, one by one, the degrees of similarity included in the i-th degree-of-similarity group, with respect to 1 to K, and weighted-summing the degrees of similarity included in the i-th degree-of-similarity group by an i-th weighting factor with respect to K selected degrees of similarity in total; and estimate, with respect to K template features that are calculation sources of K degrees of similarity having the summed degree of similarity that is highest, that K information pieces correlated in advance with the K template features are information indicative of the transmission apparatus that transmitted the received signal, wherein the K sets include a set of a template feature group indicative of a predetermined kind, and a set of a template feature group indicative of one or more other kinds, information of which can be determined by information of the predetermined kind.

2. The transmission apparatus recognition apparatus according to claim 1, wherein, among K weighting factors, weighting factors corresponding to the predetermined kind and the one or more other kinds are values normalized such that, with respect to each of the predetermined kind and the one or more other kinds, an accuracy, which is a value acquired by subtracting, from 1, an error rate that is a rate of an error of an estimation result, is calculated, and a ratio to a sum of the accuracies becomes 1 in total.

3. The transmission apparatus recognition apparatus according to claim 1, wherein the instructions are executable by the processor to further determine whether information correlated in advance with the template feature that is a calculation source of a highest degree of similarity, among the i-th degree-of-similarity group that has been calculated, has consistency between 1 to K of i.

4. The transmission apparatus recognition apparatus according to claim 1, wherein the K sets of template feature groups include at least one of a feature group indicative of an individual of the transmission apparatus, a feature group indicative of a model of the transmission apparatus, and a feature group indicative of an attribute of the transmission apparatus.

5. The transmission apparatus recognition apparatus according to claim 1, wherein the instructions are executable by the processor to further:

estimate a signal-to-noise ratio of the received signal received by the receiver; and store K weighting factors for respective levels of the signal-to-noise ratio, wherein the weighted-summing process is executed by using K weighting factors correlated with levels indicated by the signal-to-noise ratio that has been estimated.

6. A learning apparatus comprising:

a processor; and a memory storing instructions executable by the processor to:

input a radio feature generated from a received signal, the received signal being a signal wirelessly transmitted from a transmission apparatus and received; and generate a learning model which inputs the radio feature, and outputs a parameter for generating an i-th sample feature for calculating degrees of similarity to an i-th set of a template feature group, and an i-th weighting factor, with K being an integer of 2 or more and i being an integer of 1 to K, wherein K sets of template feature groups include a template feature group indicative of a predetermined kind, and a template feature group indicative of one or more other kinds, information of which can be determined by information of the predetermined kind, and the i-th weighting factor is a factor by which an i-th degree of similarity is weighted when a weighted-summing process is executed for the i-th degree of similarity with respect to 2 to K of i, the i-th degree of similarity being a degree of similarity for the i-th sample feature.

7. A transmission apparatus recognition method comprising:

generating a radio feature from a received signal received by a receiver, by a transmission apparatus recognition apparatus including the receiver configured to receive a signal wirelessly transmitted from a transmission apparatus, the transmission apparatus recognition apparatus configured to store K sets of template feature groups for estimating K kinds of information indicative of the transmission apparatus, K being an integer of 2 or more;

generating, by the transmission apparatus recognition apparatus, an i-th sample feature from the radio feature, i being an integer of 1 to K, and calculating an i-th degree-of-similarity group that is degrees of similarity between the i-th sample feature and template features included in an i-th set of the template feature group;

calculating, by the transmission apparatus recognition apparatus, a summed degree of similarity by executing a process including a weighted-summing process of selecting, one by one, the degrees of similarity included in the i-th degree-of-similarity group, with respect to 1 to K of i, and weighted-summing the degrees of similarity included in the i-th degree-of-similarity group by an i-th weighting factor with respect to K selected degrees of similarity in total; and estimating, by the transmission apparatus recognition apparatus, with respect to K template features that are calculation sources of K degrees of similarity having the summed degree of similarity that is highest, that K information pieces correlated in advance with the K template features are information indicative of the transmission apparatus that transmitted the received signal, wherein the K sets include a set of a template feature group indicative of a predetermined kind, and a set of a template feature group indicative of one or more other kinds, information of which can be determined by information of the predetermined kind.

8. A learning method comprising:

inputting a radio feature generated from a received signal, the received signal being a signal wirelessly transmitted from a transmission apparatus and received; and generating a learning model which inputs therein the radio feature that is input by the inputting, and outputs a parameter for generating an i-th sample feature for calculating degrees of similarity to an i-th set of a template feature group, and an i-th weighting factor, with K being an integer of 2 or more and i being an integer of 1 to K, wherein K sets of template feature groups include a template feature group indicative of a predetermined kind, and a template feature group indicative of one or more other kinds, information of which can be determined by information of the predetermined kind, and the i-th weighting factor is a factor by which an i-th degree of similarity is weighted when a weighted-summing process is executed for the i-th degree of similarity with respect to 2 to K of i, the i-th degree of similarity being a degree of similarity for the i-th sample feature.

\* \* \* \* \*